United States Patent
Rehof et al.

(10) Patent No.: US 7,779,382 B2
(45) Date of Patent: Aug. 17, 2010

(54) MODEL CHECKING WITH BOUNDED CONTEXT SWITCHES

(75) Inventors: Niels Jakob Rehof, Redmond, WA (US); Shaz Qadeer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1300 days.

(21) Appl. No.: 11/009,752

(22) Filed: Dec. 10, 2004

(65) Prior Publication Data

US 2006/0130010 A1 Jun. 15, 2006

(51) Int. Cl.
*G06F 9/44* (2006.01)
*G06F 9/445* (2006.01)
*G06F 11/00* (2006.01)
*G06F 15/00* (2006.01)

(52) U.S. Cl. .................. 717/104; 717/126; 717/127; 717/136; 717/149; 717/150; 714/38; 712/9; 712/227

(58) Field of Classification Search ................ None
See application file for complete search history.

(56) References Cited

U.S. PATENT DOCUMENTS

| | | | |
|---|---|---|---|
| 6,385,765 B1 * | 5/2002 | Cleaveland et al. ......... | 717/100 |
| 6,427,234 B1 * | 7/2002 | Chambers et al. .......... | 717/140 |
| 6,505,342 B1 * | 1/2003 | Hartmann et al. .......... | 717/104 |
| 6,539,345 B1 * | 3/2003 | Jones et al. ................ | 703/15 |
| 7,316,005 B2 * | 1/2008 | Qadeer et al. .............. | 717/131 |
| 7,321,988 B2 * | 1/2008 | Guo et al. .................. | 714/38 |
| 2002/0120428 A1 * | 8/2002 | Christiaens ................ | 702/186 |
| 2002/0178401 A1 * | 11/2002 | Ball et al. .................. | 714/38 |
| 2003/0204834 A1 * | 10/2003 | Ball et al. .................. | 717/106 |

OTHER PUBLICATIONS

Klaus Havelund, Thomas Pressburger "Model Checking Java Programs Using Java PathFinder", Sep. 11, 1999.*
James C. Corbett "Evaluating Deadlock Detection Methods for Concurrent Software", vol. 23 No. 3, Mar. 1996.*
U.S. Appl. No. 10/742,695, Dec. 19, 2003, Qadeer et al.
U.S. Appl. No. 10/778,969, Feb. 13, 2004, Andrews et al.
U.S. Appl. No. 10/779,002, Feb. 13, 2004, Rehof et al.
Alur et al., "Modular refinement of hierarchic reactive machines." In *POPL 00: Principles of Programming Languages*, pp. 390-402, ACM, 2000.
Autebert et al., "Context-free languages and pushdown automata." In *Handbook of Formal Languages*, vol. 1 (Eds.: G. Rozenberg and A. Salomaa), pp. 111-174, Springer-Verlag, 1997.
Ball et al., "The SLAM project: Debugging system software via static analysis." In *POPL 02: Principles of Programming Languages*, pp. 1-3, ACM, Jan. 2002.

(Continued)

*Primary Examiner*—Tuan Q Dam
*Assistant Examiner*—Isaac T Tecklu
(74) *Attorney, Agent, or Firm*—Klarquist Sparkman, LLP

(57) ABSTRACT

Validity of one or more assertions for any concurrent execution of a plurality of software instructions with at most k−1 context switches can be determined. Validity checking can account for execution of the software instructions in an unbounded stack depth scenario. A finite data domain representation can be used. The software instructions can be represented by a pushdown system. Validity checking can account for thread creation during execution of the plurality of software instructions.

15 Claims, 9 Drawing Sheets

OTHER PUBLICATIONS

Bouajjani et al., "A generic approach to the static analysis of concurrent programs with procedures." In *POPL 03: Principles of Programming Languages*, pp. 62-73, ACM, 2003.

Clarke et al., "Bounded model checking using satisfiability solving." *Formal Methods in System Design*, 19(1):7-34, 20001.

Clarke et al., "Synthesis of synchronization skeletons for branching time temporal logic," In *Logic of Programs*, LNCS 131, pp. 52-71, Springer-Verlag, 1981.

Corbett et al., "Bandera: Extracting finite-state models from Java source code." In *ICSE 00: Software Engineering*, 2000.

Das et al., "ESP: Pathsensitive program verification in polynomial time." In *PLDI 02: Programming Language Design and Implementation*, pp. 57-69, ACM, 2002.

Duesterwald et al., "Concurrency analysis in the presence of procedures using a data-flow framework." In *Tav 91: Testing, Analysis and Verification*, pp. 36-48, ACM, 1991.

Dwyer et al., "Data flow analysis for verifying properties of concurrent programs." In *FSE 94: Foundations of Software Engineering*, pp. 62-75, ACM 1994.

Esparza et al., "Efficient algorithms for pre* and post* on interprocedural parallel flow graphs." In *POPL 00: Principles of Programming Languages*, pp. 1-11, ACM 2000.

Finkel et al., "A direct symbolic approach to model checking pushdown systems." *Electronic Notes in Theoretical Computer Science*, 9, 1997.

Giannakopoulou et al., "Assumption generation for soft-ware component verification," In *ASE 02: Automated Software Engineering*, pp. 3-12, 2002.

Godefroid, "Model checking for programming languages using verisoft," In *POPL 97: Principles of Programming Languages*, pp. 174-186, 1997.

Holzmann, "The model checker SPIN," *IEEE Transactions on Software Engineering* 23(5):279-295, May 1997.

Musuvathi et al., "CMC: A pragmatic approach to model checking real code," In *OSDI 02: Operating Systems Design and Implementation*, 2002.

Pong et al., "Verification techniques for cache coherence protocols," *ACM Computing Surveys* 29(1):82-126, 1997.

Queille et al., "Specification and verification of concurrent systems in CESAR," In M. Dezani-Ciancaglini and U. Montanari, editors, *Fifth International Symposium on Programming*, Lecture Notes in Computer Science 137, pp. 337-351, Springer-Verlag, 1981.

Ramalingam, "Context sensitive synchronization sensitive analysis is undecidable," *ACM Trans. On Programming Languages and Systems* 22:416-430, 2000.

Reps et al., "Precise interprocedural dataflow analysis via graph reachability," In *POPL 95: Principles of Programming Languages*, pp. 49-61, ACM, 1995.

Rinard, "Analysis of multithreaded programs," In *SAS 01: Static Analysis*, LNCS 2126, pp. 1-19, Springer-Verlag, 2001.

Dwyer et al., "Bogor: An extensible and highly-modular model checking framework," In *FSE 03: Foundations of Software Engineering*, pp. 267-276, ACM, 2003.

Schwoon, *Model-Checking Pushdown Systems*, PhD Thesis, Lehrstuhl für Informatik VII der Technischen Universität München, 2000.

Sharir et al, "Two approaches to interprocedural data flow analysis," In *Program Flow Analysis: Theory and Applications*, pp. 189-233, Prentice-Hall, 1981.

Visser et al., "Model checking programs," In *ASE 00: Automated Software Engineering*, pp. 3-12, 2000.

Yahav, "Verifying safety properties of concurrent Java programs using 3-valued logic," In *POPL 01: Principles of Programming Languages*, pp. 27-40, 2001.

Chaki et al., "Modular verification of software components in C," *IEEE Transactions on Software Engineering*, 30(6):388-402, Jun. 2004.

Henzinger et al., "Race checking by context inference," *PLDI 04: Conference on Programming Language Design and Implementation*, pp. 1-13, Jun. 9-11, 2004.

Henzinger et al., "Thread-modular abstraction refinement," *CAV 03: Computer Aided Verification, 15th International Conference Proceedings*, pp. 262-274, Jul. 8-12, 2003.

Qadeer et al., "Summarizing procedures in concurrent programs," *POPL 2004: 31st Annual Symposium on Principles of Programming Languages*, pp. 245-255, Jan. 14-16, 2004.

Qadeer et al., "KISS: Keep it simple and sequential," *PLDI 04: Conference on Programming Language Design and Implementation*, pp. 14-24, Jun. 9-11, 2004.

\* cited by examiner

MODEL CHECKING WITH BOUNDED CONTEXT SWITCHES

TECHNICAL FIELD

The technical field relates to software modeling, more particularly to modeling of multithreaded software.

BACKGROUND

The design of concurrent programs is a complex endeavor. The main intellectual difficulty of this task lies in reasoning about the interaction between concurrently executing threads. Concurrency results in insidious programming errors that are difficult to reproduce and fix. Therefore, analysis techniques that can automatically detect and pinpoint errors in concurrent programs can be invaluable. Thus, there is a need for static analysis based on model checking for finding subtle safety errors in concurrent programs.

Concurrent programs are significantly more difficult to analyze than sequential programs. For example, the problem of checking assertions in a single-threaded Boolean program with procedures (and consequently an unbounded stack) is decidable. In fact, the algorithm for solving this problem is the basis of a number of efficient static analysis tools for sequential programs. But the problem of checking assertions in a multi-threaded Boolean program with procedures is undecidable.

In the face of this undecidability, most analyses for concurrent programs presented so far have suffered from two limitations. Some analyses restrict the synchronization model, which makes the analysis inapplicable to most common concurrent software applications. A common problem with using abstract data domains, for example, is the threat of false positives (e.g., reports of non-existent bugs). Other analyses are imprecise either because they are flow-insensitive or because they use decidable but coarse abstractions. This limitation makes it extremely difficult to report errors accurately to programmers. As a result, these analyses have seen limited use in checking tools for concurrent software.

Thus, there still remains a need for improved model checking for concurrent software.

SUMMARY

Model checking can proceed with bounded context switches. For example, given a representation of a plurality of software instructions (e.g., a multi-threaded program), the validity of one or more assertions for any concurrent execution of the instructions with at most k−1 context switches can be determined.

A representation (e.g., a model) of a set of software instructions can be received (e.g., by a model checker). For example, a set of software instructions from a multithreaded program can be translated into a form used by a model checker. Translation can include abstraction (e.g., creating a finite data domain representation), such as translating the instructions into a Boolean program. Translation can include constructing a pushdown system representing the software instructions.

Validity determination can include a reachability analysis performed on the representation. The validity determination can account for unbounded stack depth (e.g., to support software using recursion) and dynamic thread creation (e.g., threads created during execution of the software).

The technology can find each invalid assertion (e.g., in light of the context-switch bound). And, the technology can avoid false positives (e.g., reporting that a valid assertion is invalid).

The foregoing and other features and advantages will become more apparent from the following detailed description of disclosed embodiments, which proceeds with reference to the accompanying drawings.

DETAILED DESCRIPTION

Example 1

Exemplary System for Analyzing Multithreaded Software

Figure 1:
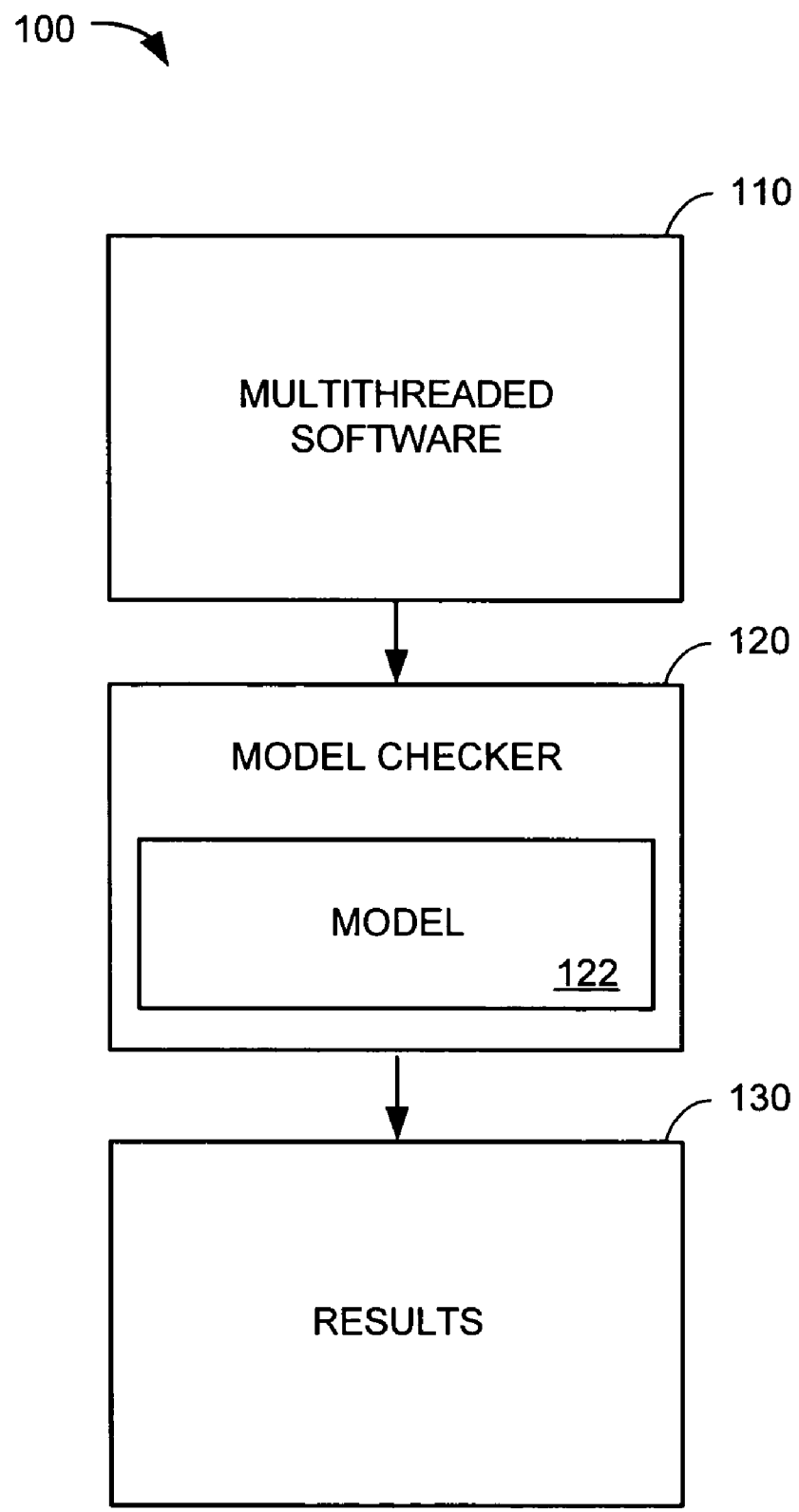
FIG. 1 is a block diagram showing an exemplary system for analyzing multithreaded software.

FIG. 1 is a block diagram representing an exemplary system 100 for analyzing multithreaded software. In the example, the system takes multithreaded software 110 as input. A model checker 120 analyzes the multithreaded software 110. For example, the model checker 120 can model execution of multithreaded software 110 to detect programming flaws.

In practice, the multithreaded software 110 can be first converted into a model 122, which can represent the multithreaded software 110 in a form appropriate to facilitate modeling.

The model checker 120 can generate results 130. For example, the model checker can indicate whether the multithreaded software 110 contains programming flaws and information about such flaws.

In any of the examples herein, the model checker 120 can be adapted to determine the validity of one or more assertions for any concurrent execution of the multi-threaded software with an upper bound on the number of (e.g., at most k−1) context switches. Thus, the model checker 120 is operable to check validity of assertions for a multi-threaded execution of a multi-threaded program with at most a number of context switches determined based at least in part upon the upper bound. The number k−1 is used in examples herein to facilitate integration with various examples that describe properties holding true for k contexts (e.g., the uninterrupted sequence of actions by a single thread between context switches). However, any positive integer n (e.g., 2 or more) can be chosen for use with the technology.

Also, although a fixed number of threads (e.g., 2 or more) can be used, the model checker can account for dynamic thread creation (e.g., creation of threads during execution of the multi-threaded software).

Example 2

Exemplary Method for Analyzing Multithreaded Software

Figure 2:
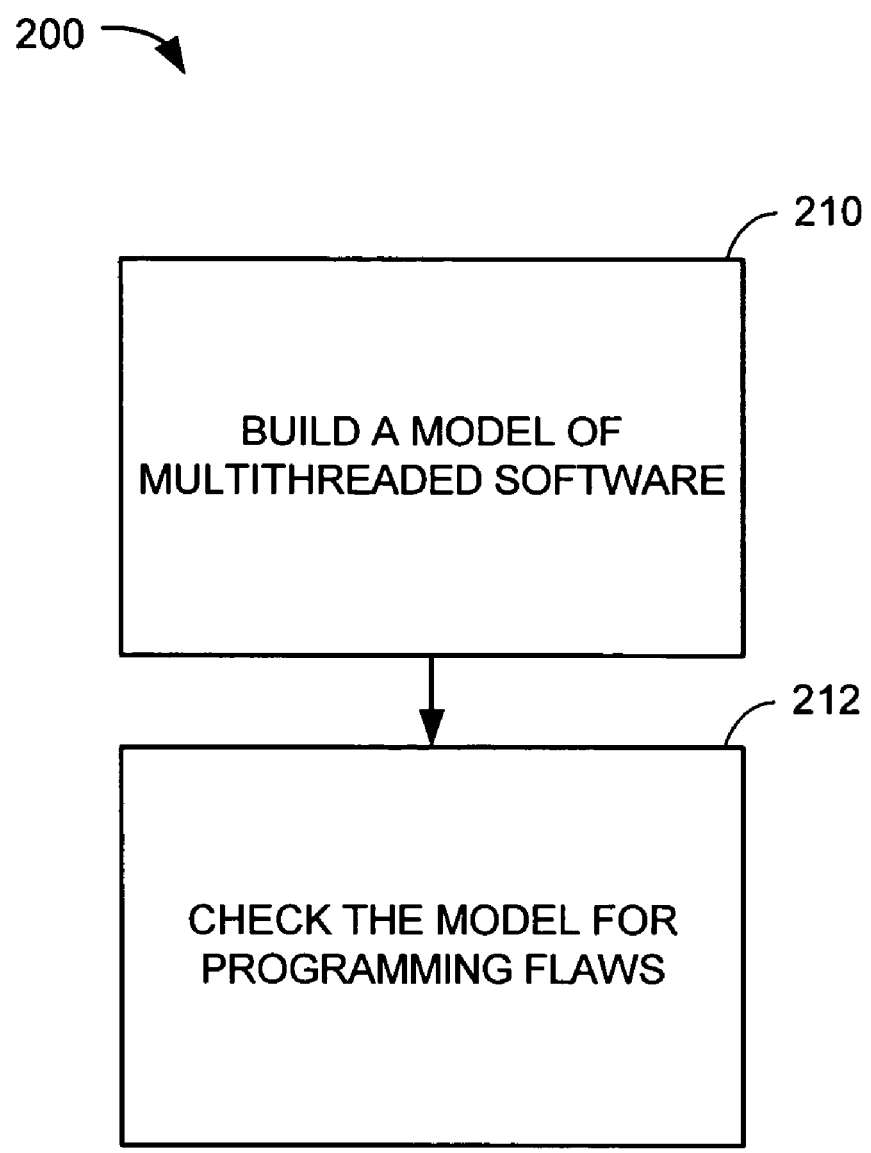
FIG. 2 is a flowchart showing an exemplary method for analyzing multithreaded software, such as with the system shown in FIG. 1.

FIG. 2 is a flowchart showing an exemplary method 200 for analyzing multithreaded software, such as with the system 100 shown in FIG. 1. The methods of any of the examples described herein can be performed in software executing computer-executable instructions. Such instructions can be stored in one or more computer-readable media.

At 210, a model of multithreaded software is built. In any of the examples herein, building the model can include constructing a finite data domain representation of the software. In any of the examples herein, building the model can include constructing a pushdown system representation of the software (e.g., a pushdown model based on the finite data domain representation).

At 212, the model can be checked for programming flaws. For example, execution of the software can be modeled to detect whether any specified invariants (e.g., asserts) fail for any execution path of the software. In any of the examples described herein, the number of context switches for the execution path of the software can be bounded.

In practice, building the model and checking for programming flaws can be combined into a single process. For example, the model can be built as the model for the multi-threaded software is checked for programming flaws.

Example 3

Figure 3:
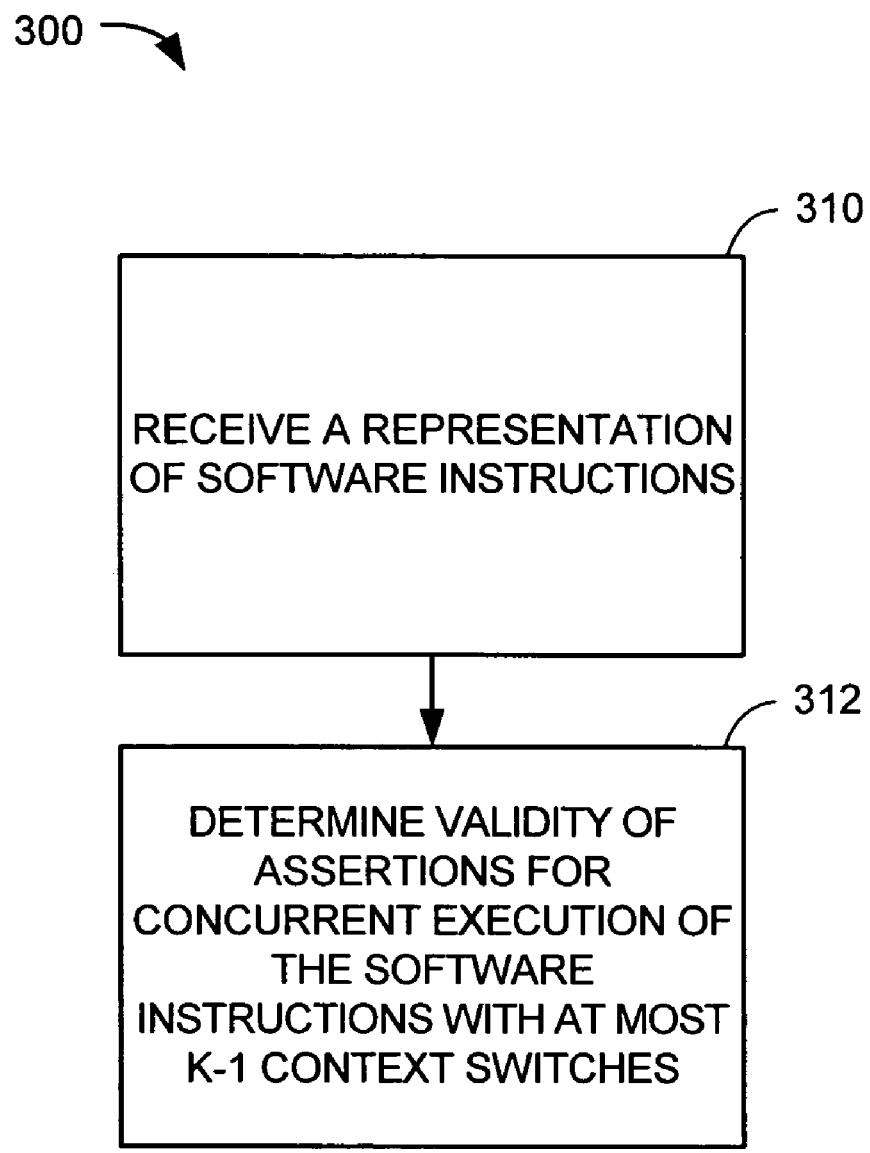
FIG. 3 is a flowchart showing an exemplary method for analyzing multithreaded software via bounded context switches.

Exemplary Method for Analyzing Multithreaded Software with Bounded Context Switches FIG. 3 is a flowchart showing an exemplary method 300 for analyzing multithreaded software via bounded context switches. At 310, a representation of software instructions (e.g., a multi-threaded program) is received. The representation may be created as part of the method 300. Alternatively, the representation may be created external to the method 300.

At 312, validity is determined for one or more assertions for any concurrent execution of the software instructions with at most k–1 context switches. For example, execution of the software can be modeled to detect whether any specified invariants (e.g., asserts) fail for any execution path of the software. The validity determination can account for unbounded stack depth. The validity determination can also be performed for dynamic thread creation (e.g., threads created during execution of the software being modeled).

Example 4

Exemplary Software to be Tested

In any of the examples herein, software to be tested can take the form of source code, from which a model of the software can be generated automatically by the testing system. For example, the modeled software can take the form of source code of languages such as C, C++, the VISUAL BASIC programming language of Microsoft Corporation, the JAVA language of Sun Microsystems, Inc., and related or other languages.

If desired, the source language can be translated into an intermediate form (e.g., an intermediary source-like language), from which the software model is generated. In this way, any number of source languages can be supported by first translating them into the intermediate form.

During construction of a model representing the source language, a finite data domain representation can be generated. Further, a pushdown system representing the source (e.g., a pushdown system representing a finite data domain version of the source) can be generated.

The system can support a wide variety of software to be tested. For example, the modeled software to be tested can include concurrent programs, such as multithreaded programs. Although concurrency is commonly used in web services and workflows, the techniques described herein can also be applied to any other (e.g., operating system, device driver, and the like) software.

Example 5

Exemplary Multithreaded Software

Exemplary multithreaded software includes software that makes use of more than one thread during execution of the software. For example, multithreaded software can include a scenario where two threads access one or more shared variables. Such software can include synchronization mechanisms (e.g., locks, mutexes, semaphores and the like) to avoid undesirable phenomena such as race conditions for shared variables or other conditions associated with execution of concurrent programs. Whenever multiple threads are present, various types of interleavings between threads is possible, and the exact order of execution is generally indeterminable beforehand. There exists a potentially exponential number of ways interleavings can take place. In practice, two or more threads may be executing different (e.g., separate) code.

Example 6

Exemplary Context Switching

A context switch refers to the phenomenon of switching execution from one thread to another. Thus, as used herein, a context generally refers to an uninterrupted sequence of actions by a single thread (e.g., between context switches). Thus, in an execution with k contexts, execution switches from one thread to another k–1 times.

In any of the examples herein, the value for k can be greater than one (i.e., k–1 is greater than zero). k may take any (e.g., positive) representable value; therefore, an arbitrary upper bound on the number of context switches can be specified. In any of the examples herein, the value for k or k–1 can be configured if desired. For example, the value can be input by a user or set as a constant. In any of the examples herein, it may be desirable to use some other notation to represent the number of context switches (e.g., n).

Example 7

Exemplary Unbounded Stack Depth

A difficulty with context bounded model checking is that in each thread context, an unbounded number of stack configurations could be reachable due to recursion. Since a context switch may happen at any time, a precise analysis needs to account for scheduling other threads from any of these configurations. To guarantee termination, a systematic state exploration algorithm can use a finite representation of an unbounded set of stack configurations. Previous algorithms based on transactions and procedure summaries are not guaranteed to terminate for context-bounded model checking because they keep an explicit representation of the stack of each thread.

Example 8

Exemplary Model Checker

Figure 4:
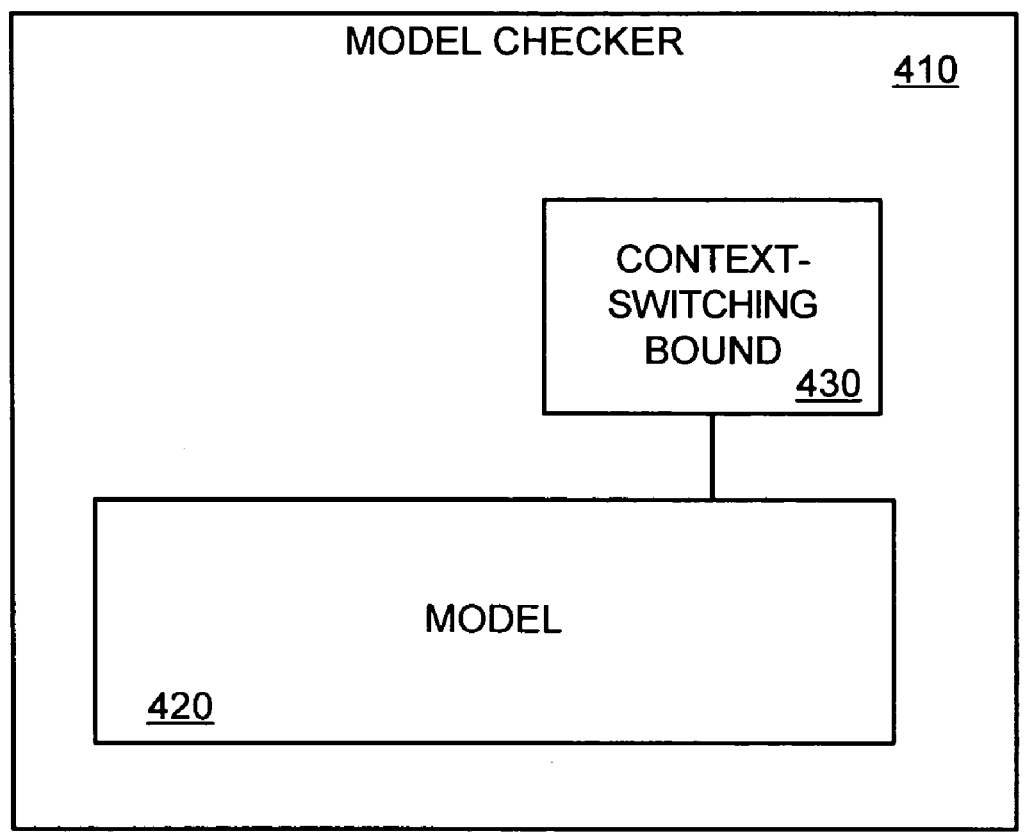
FIG. 4 is a block diagram showing an exemplary model checker for analyzing multithreaded software via bounded context switches.

FIG. 4 is a block diagram showing an exemplary model checker 410 for analyzing multithreaded software via bounded context switches. A model checker generally explores the possible ways (e.g., all possible ways or a relevant subset thereof) of executing a system. In the example, the model checker 410 receives a model 420 of multithreaded software. A context-switches bound 430 (e.g., a limit on the number of context switches allowed during modeling) is applied to the model 420 during processing. The model checker 410 can search through various interleavings for concurrent execution of the software represented by the model, but will find only those assertion violations that occur within the number of context switches as indicated by the context-switches bound. If an assertion fails within the number of context switches, the model checker will find it. Further, the model checker can be constructed such that every assertion reported as failed is failed (e.g., it is not a false positive).

Example 9

Exemplary Abstraction

In any of the examples herein, various abstraction techniques can be applied when generating a representation of software instructions. For example, a finite data domain representation of the software instructions can be created.

In practice, certain calculations (e.g., as part of if-then statements) can be ignored, and a generic non-determinative function substituted in its place.

Abstraction can also include creating a pushdown system that represents the software instructions. The pushdown system can be based on the finite data domain representation of the software.

Example 10

Exemplary Results Reporting

Figure 5:
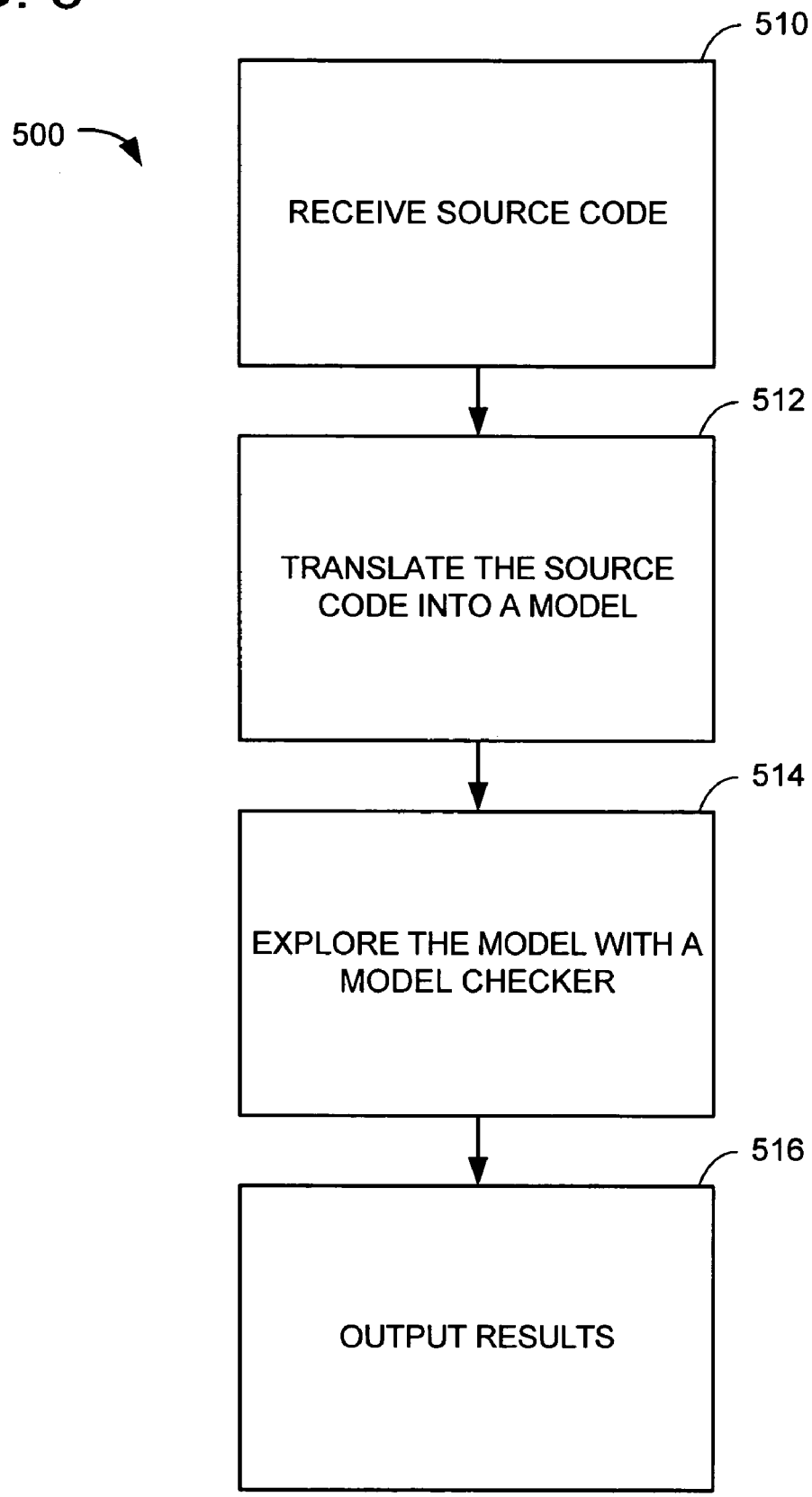
FIG. 5 is a flowchart showing an exemplary method 400 of providing results that can be performed in conjunction with a model checker, such as the model checker 310 of FIG. 3.

FIG. 5 shows an exemplary method 500 for reporting results that can be performed in conjunction with a model checker, such as the model checker 410 of FIG. 4.

At 510, source code is received (e.g., by model checker 410 of FIG. 4).

At 512, source code is translated into a model (e.g., a pushdown system) using an input language for a model checker. In some instances, the model checker can perform the translation. In other instances, the translation can be performed external to the model checker.

At 514, the model checker explores the model looking for bugs (e.g., failed assertions). A bound (e.g., a limit on the number of context switches allowed) may be set.

At 516, results from the exploration may be provided as output (e.g., to a programmer). Results can include an error trace (e.g., a stepwise series of executions that lead to a bug).

Example 11

Exemplary Source Code Translation

Figure 6:
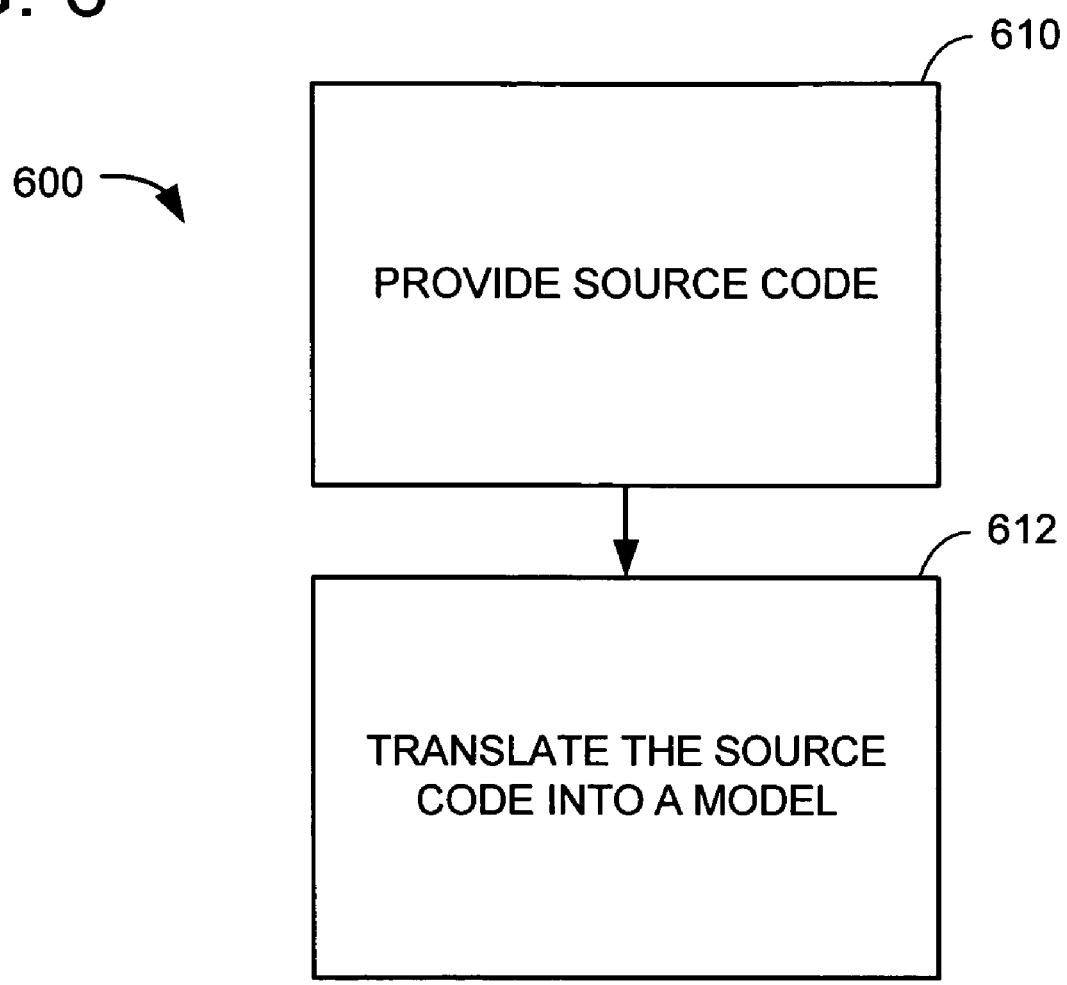
FIG. 6 is a flowchart showing an exemplary method of translating source code into a model. In the example, the model can be a finite state model (e.g., having a finite set of nodes).

FIG. 6 shows an exemplary method 600 for translating source code into a model.

At 610, source code (e.g., software instructions) is provided as input.

At 612, the source code is translated into a model (e.g., to be used in conjunction with a model checker to identify possible programming flaws within the source code). For example, the source code can be translated into a model that can be explored with an upper bound on the number of context switches.

Example 12

Exemplary Model Exploration

Figure 7:
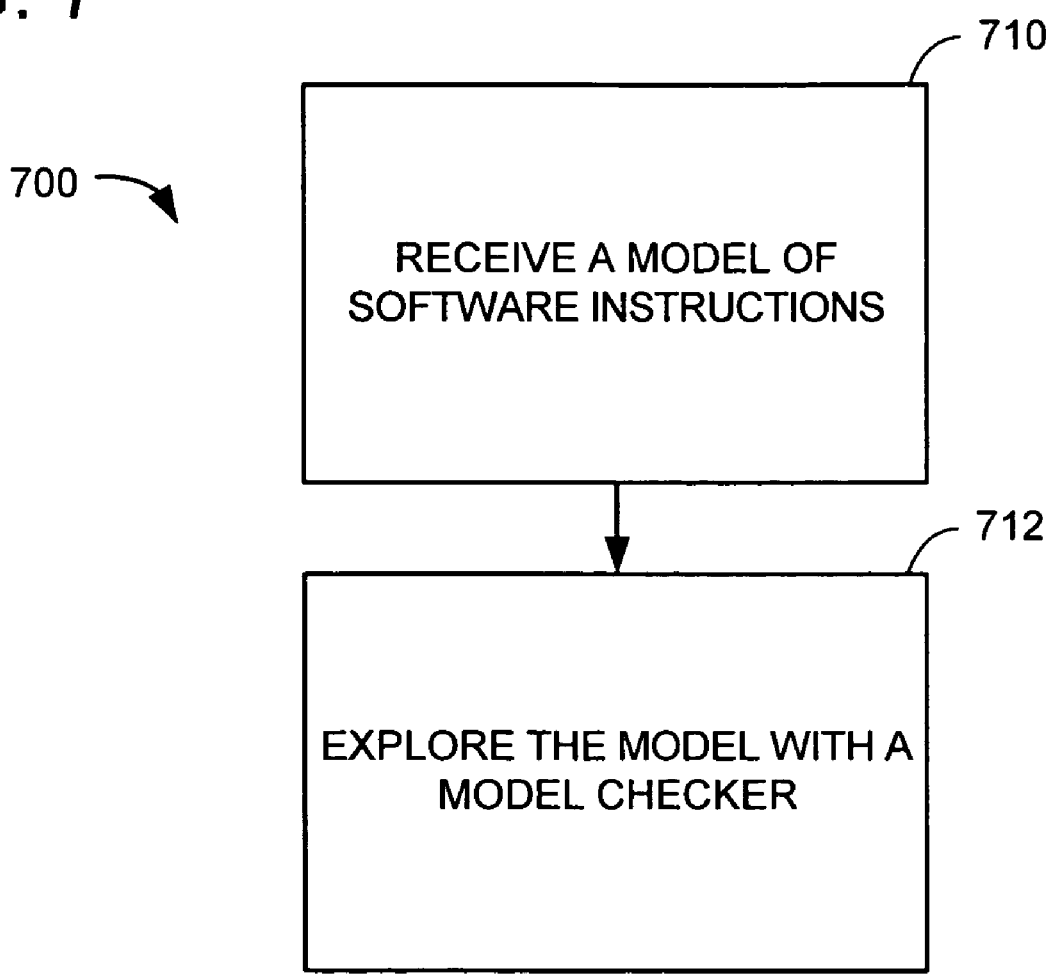
FIG. 7 is a flowchart showing an exemplary method for exploring a model of software instructions.

FIG. 7 shows an exemplary method 700 for exploring a model of software instructions.

At 710, a model of software instructions is received.

At 712, the model is explored with a model checker to seek and identify possible programming flaws within the software instructions. A bound can be set on the number of context switches during concurrent execution of the software modeled.

Example 13

Exemplary Determination of Validity of Assertions

Figure 8:
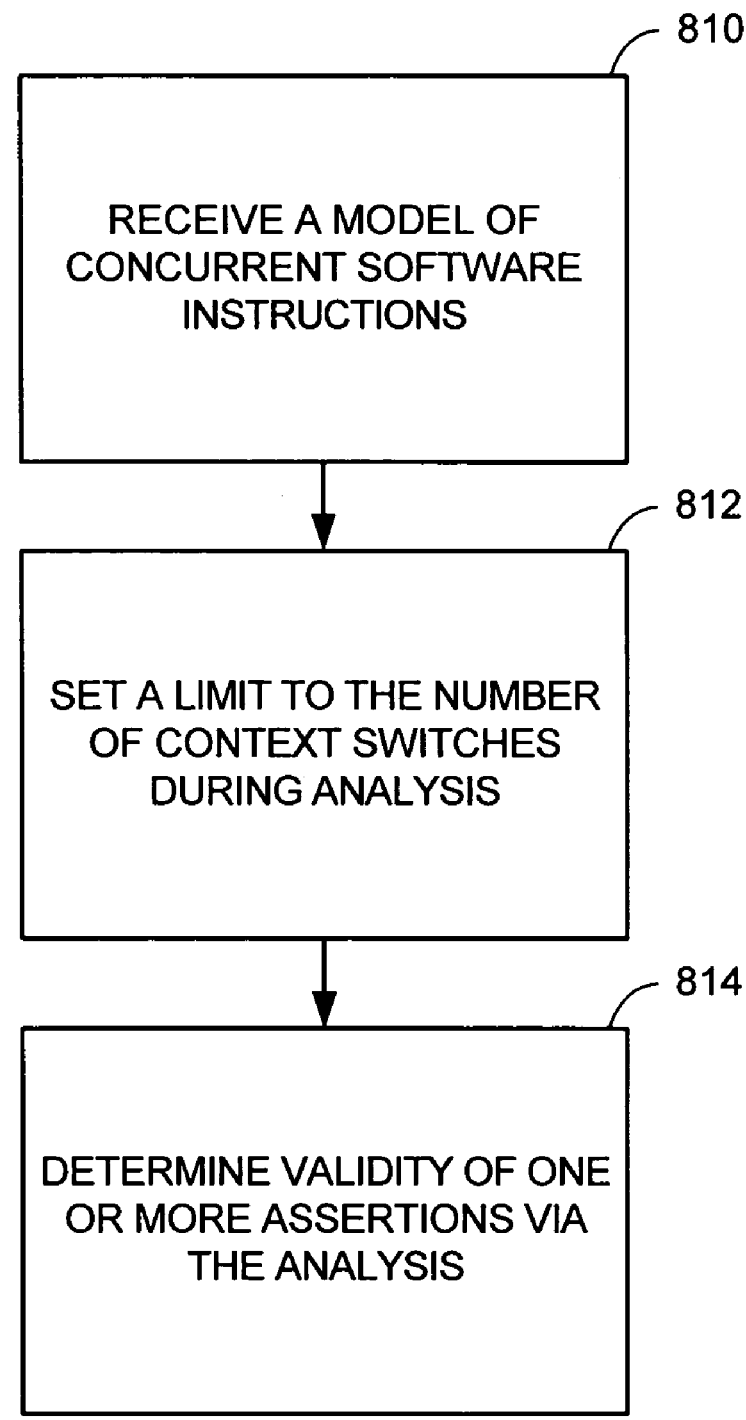
FIG. 8 is a flowchart showing an exemplary method for determining validity of assertions for execution of a set of software instructions.

FIG. 8 is a flowchart showing an exemplary method for determining validity of assertions for execution of a set of software instructions.

At 810, a model of a set of concurrent software instructions (e.g., a multi-threaded program) is received.

At 812, a limit to the number of context switches to be allowed is set. The limit will be applied during analysis of the model. The limit may be an arbitrary value or otherwise determined.

At 814, the validity of one or more assertions for concurrent execution of the concurrent software instructions (e.g., with at most the number of context switches set) is determined as part of the analysis.

Example 14

Exemplary Reachability

A thread can be represented by a stack machine. Reachability for a stack machine (e.g., a thread) with a finite data domain is generally decidable. This is usually because it can be represented by something that is finite (e.g., a finite state machine). Reachability for a stack machine with an infinite data domain is generally undecidable. In the example, data domains can be abstracted to facilitate the use of a finite data domain in a situation that would otherwise require an infinite data domain. For example, a finite state machine can represent a set of reachable configurations of a pushdown system.

Example 15

Exemplary Advantage: Finding Failed Assertions

In any of the examples described herein, a constant number (e.g., k) can be chosen for use with the technology to determine whether an assertion will fail for any concurrent execution involving k−1 context switches. Thus, there could be a concurrent execution that does result in a failed assertion (e.g., on the $k^{th}$ context switch).

However, in a great many cases, an assertion will fail within a relatively small number of k. For example, although k bounds the number of context switches, it does not bound the number of instructions that a thread might execute between context switches. Thus, an exceedingly long error trace may result in finding a failed assertion, even if there are only a relatively small number of context switches.

Accordingly, in practice, the technology can have great value for software verification purposes.

Example 16

Exemplary Pushdown Systems

In any of examples described herein, software can be modeled via a pushdown system. Whether an assertion fails can be determined via a reachability analysis. Due to the properties of pushdown systems, it can be shown that determining whether an assertion fails within a bounded number of context switches for a finite data domain is decidable, even with unbounded stack depth. Thus, the analysis can account for programs using recursion.

Further, it can be shown that the model checking can be constructed so that no false positives are found (e.g., every assertion identified as invalid is invalid). Further, it can be shown that the model checking can account for dynamic thread creation (e.g., creation of threads during execution of the software being modeled). Each thread can be represented by a pushdown system.

Example 17

Exemplary Determination of Reachability

An interprocedural static analysis on a concurrent program defines a k-bounded transition relation; defines at least one aggregate configuration based at least in part upon the k-bounded transition relation; defines at least one transition relation based at least in part upon the aggregate configuration; and determines, via the above three, whether at least one execution path within a configuration of a concurrent pushdown system is reachable.

In the example, the configuration of the concurrent pushdown system can be determined to be reachable if $c_{in} \rightarrow^*_p c$, wherein $c_{in}$ represents an initial configuration of the concurrent pushdown system and c represents the configuration of the concurrent pushdown system.

In the example, the configuration can be deemed to be k-reachable if $$c_{in} \xrightarrow{K} c,$$

wherein $c_{in}$ represents an initial configuration of the concurrent pushdown system, c represents the configuration of the concurrent pushdown system, and K represents the k-bounded transition relation.

Example 18

Exemplary Thread Representation

In any of the examples described herein, a thread can be represented by a pushdown system. Additionally, multiple threads can be represented by multiple pushdown systems, respective threads being represented by a corresponding pushdown system.

Example 19

Exemplary Sample Code Having Subtle Bugs Caused by Concurrency

This example demonstrates how subtle bugs caused by concurrency can be manifested by executions with few contexts. Table 1 shows code that is typically found in certain device drivers for handling asynchronous Interrupt Request Packet (IRP) cancellation.

TABLE 1

Sample Code

```
NTSTATUS
DispatchRoutine(
    DEVICE_OBJECT *obj,
    IRP *irp)
{
    DEVICE_EXTENSION *e =
        obj->DeviceExtension;
    .
    .
    .
    IoSetCancelRoutine (irp, CancelRoutine);
    KeAcquireSpinLock(&e->SpinLock);
    EnqueueIrp(irp);
    KeReleaseSpinLock(&e->SpinLock);
    IoMarkIrpPending(irp);
    return STATUS_PENDING;
}
void CancelRoutine(
    DEVICE_OBJECT *obj,
    IRP *irp)
{
    DEVICE_EXTENSION *e =
        obj->DeviceExtension;
    IoReleaseCancelSpinLock( );
    .
    .
    .
    KeAcquireSpinLock(&e->SpinLock);
    DequeueIrp(irp);
    KeReleaseSpinLock(&e->SpinLock);
    IoCompleteIrp(irp);
}
void IoCancelIrp(IRP *irp)
{
    DEVICE_OBJECT *obj;
    void (*Routine) (IRP *);
    IoAcquireCancelSpinLock( );
```

TABLE 1-continued

Sample Code

```
        .
        .
        .
        Routine = IoSetCancelRoutine(irp, NULL);
        if (Routine != NULL) {
            Routine(irp);
        }
    }
}
```

DispatchRoutine is a typical dispatch function of a device driver. The code for this function shows that a decision has been made to enqueue irp for future processing. First, the function IoSetCancelRoutine is called to set a cancellation routine for irp. The cancellation routine is called by the operating system if irp is cancelled. Then, irp is enqueued into a device queue under the protection of a spin lock. Finally, irp is marked pending and STATUS_PENDING is returned. While a thread is processing irp in DispatchRoutine, the operating system may cancel irp asynchronously by calling the function IoCancelIrp in another thread. This thread calls the cancel routine for irp if it is non-null.

Consider the following execution. The first thread begins by calling DispatchRoutine(obj, irp), sets the cancellation routine for irp to CancelRoutine, and proceeds until the call to IoMarkIrpPending(irp). Just before this call, a context switch occurs and IoCancelIrp (obj, irp) begins execution in a second thread. This thread calls CancelRoutine(obj, irp), which eventually calls IoCompleteIrp(irp). A second context switch occurs and the first thread calls IoMarkIrpPending(irp), thereby violating the following important rule governing the interface between the driver and the operating system.

An IRP should not be marked pending after it has been completed.

Note that the erroneous execution had only three contexts (and two context switches). Additional experimental evidence for the belief that many errors manifest within a small number of contexts is provided by previous work with an existing static checker, where a variety of errors could be found in low-level systems code similar to the one shown above.

Example 20

Exemplary Pushdown Systems

Referring to Table 2, let G and $\Gamma$ be arbitrary fixed finite sets. One should refer to G as the set of global states and refer to $\Gamma$ as the stack alphabet. One should let g range over elements of G and let $\gamma$ range over elements of $\Gamma$. A stack w is an element of $\Gamma^*$, the set of finite strings over $\Gamma$, including the empty string $\in$. A configuration c is an element of $G \times \Gamma^*$; configurations can be written as $c = \langle g, w \rangle$ with $g \in G$ and $w \in \Gamma^*$.

TABLE 2

| | | Domains | |
|---|---|---|---|
| $\gamma$ | $\in$ | $\Gamma$ | Stack alphabet |
| w | $\in$ | $\Gamma^*$ | Stack |
| g | $\in$ | G | Global state |
| $\Delta$ | $\subseteq$ | $(G \times \Gamma) \times (G \times \Gamma^*)$ | Transition relation |

TABLE 2-continued

| | | Domains | |
|---|---|---|---|
| c | $\in$ | $G \times \Gamma^*$ | Configuration |
| $\rightarrow_\Delta$ | $\subseteq$ | $(G \times \Gamma^*) \times (G \times \Gamma)$ | Pds transition |

A transition relation $\Delta$ over G and $\Gamma$ is a finite subset of $(G \times \Gamma) \times (G \times \Gamma^*)$. A pushdown system $P = (G, \Gamma, \Delta, g_{in}, w_{in})$ is given by G, $\Gamma$, a transition relation $\Delta$ over G and $\Gamma$, and an initial configuration $\langle g_{in}, w_{in} \rangle$. The transition relation $\Delta$ determines a transition system on configurations, denoted $\rightarrow_\Delta$ as follows:

$$\langle g, \gamma w' \rangle \rightarrow_\Delta \langle g', ww' \rangle$$

for all $w' \in \Gamma^*$, if and only if $(\langle g, \gamma \rangle, \langle g', w \rangle) \in \Delta$. $\rightarrow^*_\Delta$ is written to denote the reflexive, transitive closure of $\rightarrow_\Delta$. Notice that, by the signature of $\Delta$, there are no transitions $\rightarrow_\Delta$ from a configuration whose stack is empty. Hence, a pushdown system as defined here halts when the stack becomes empty.

A configuration c of a pushdown system is generally called reachable if and only if $c_{in} \rightarrow^*_\Delta c$, where $c_{in}$ is the initial configuration of the pushdown system. In general, there can be infinitely many reachable configurations of a pushdown system, because the stack is unbounded.

The reachability problem for pushdown systems is decidable because the set of reachable configurations (sometimes called the pushdown store language) of a pushdown system is regular. A regular pushdown store automaton $A = (Q, \Gamma, \delta, I, F)$ is a finite automaton with states Q, alphabet $\Gamma$, transition relation $\delta \subseteq Q \times \Gamma \times Q$, initial states I and final states F. The automaton may contain $\in$-transitions. The sets Q and I satisfy $G \subseteq Q$ and $I \subseteq G$. Such an automaton defines a language of pushdown configurations by the following rule:

A accepts a pushdown configuration $\langle g, w \rangle$, if and only if A accepts the word w when started in the state g.

A subset $S \subseteq G \times \Gamma^*$ of pushdown configurations is generally called regular if and only if there exists a regular pushdown store automaton A such that $S = L(A)$.

For a pushdown system $P = (G, \Gamma, \Delta, g_{in}, w_{in})$ and a set of configurations $S \subseteq G \times \Gamma^*$, let $Post_\Delta^*(S)$ be the set of states reachable from S, i.e., $Post_\Delta^*(S) = \{c | \exists c' \in S. c' \rightarrow^*_\Delta c\}$. The following theorem shows that the set of reachable configurations from a regular set of configurations is again regular:

Theorem 1: Let $P = (G, \Gamma, \Delta, g_{in}, w_{in})$ be a pushdown system, and let A be a regular pushdown store automaton. There exists a regular pushdown store automaton A' such that $Post_\Delta^*(L(A)) = L(A')$. The automaton A' can be constructed from P and A in time polynomial in the size of P and A.

The construction of A' from A can be done by adding states and transitions to A. Let g, g' range over G and let q range over Q. For every pair $(g', \gamma')$ such that $\Delta$ contains a transition $(\langle g, \gamma \rangle, \langle g', \gamma', \gamma'' \rangle)$ a new state $q_{g', \gamma'}$ is added. Three kinds of transitions are successively added. First, a transition $(g', \in, q)$ is added whenever $(\langle g, \gamma \rangle, \langle g', \in \rangle) \in \Delta$ and $q \in \delta^*(g, \gamma)$. Second, if $(\langle g, \gamma \rangle, \langle g', \gamma' \rangle) \in \Delta$ and $q \in \delta^*(g, \gamma)$ then transition $(g', \gamma', q)$ is added. Third, if $(\langle g, \gamma \rangle, \langle g', \gamma', \gamma'' \rangle) \in \Delta$ and $q \in \delta^*(g, \gamma)$ then transitions $(g', \gamma', q_{g', \gamma'})$ and $(q_{g', \gamma'}, \gamma'', q)$ are added.

Example 21

Exemplary Concurrent Pushdown Systems

A concurrent pushdown system is a tuple $P = (G, \Gamma, \Delta_0, \ldots, \Delta_N, g_{in}, w_{in})$ with transition relations $\Delta_0, \ldots, \Delta_N$ over G and $\Gamma$, $N \geq 0$, an initial state $g_{in}$ and an initial stack $w_{in}$. A configuration of a concurrent pushdown system is a tuple $c = \langle g, w_0, \ldots, w_N \rangle$ with $g \in G$ and $w_i \in \Gamma^*$, that is, a global state g followed by a sequence of stacks $w_i$, one for each constituent transition relation. The initial configuration of P is ($g_{in}$, $w_{in}, \ldots, w_{in}$) where all N+1 stacks are initialized to $w_{in}$. The transition system of P, denoted $\rightarrow$p, rewrites configurations of P by rewriting the global state together with any one of the stacks, according to the transition relations of the constituent pushdown systems.

Formally, $$\langle g, w_0, \ldots, w_i, \ldots w_N \rangle \rightarrow_i \langle g', w_0, \ldots, w_i', \ldots w_N \rangle$$

is defined if and only if $$\langle g, w_i \rangle \rightarrow_{\Delta_i} \langle g', w_i' \rangle$$

The transition relation $\rightarrow$p is defined on configurations of P by the union of the $\rightarrow_i$, i.e., $\rightarrow p = \cup_{i=0}^{N} \rightarrow_i$.

TABLE 3

Concurrent Pushdown System

| boolean m = 0, task = 0; | |
|---|---|
| Thread 0 | Thread 1 |
| while(1) { | while(1) { |
| L1: wait(¬m); | L4: wait(m); |
| L2: InitTask( ); | L5: DoTask( ); |
| L3: m := 1; | L6: m := 0; |
| } | } |
| InitTask( ) { | DoTask( ) { |
| L7: task := {0,1}; | L8: task := ¬task; |
| } | } |

To illustrate how a concurrent pushdown system can be used to represent programs, a simple program with two threads is shown in Table 3. This program is represented as a concurrent pushdown system $P = (G, \Gamma, \Delta_0, \Delta_1, g_{in}, w_{in})$. One should let G be the set of valuations to global variables m and task. There is a special local variable pc, the program counter, which takes values from the set of program labels PC={L0, L1, L2, ..., L8}. L0 is a special label not present in the program used to initialize the stack of each thread. One should let $\Gamma$ be the set of valuations to pc. One should write (m, task) to denote the valuation assigning the value m to m and the value task to task. Hence, a transition ($\langle g, \gamma \rangle$, $\langle g', w \rangle$) has the form $$(\langle (m, task), pc \rangle, \langle (m', task'), w \rangle)$$

where $w \in PC^*$.

The initial global state $g_{in} = (0, 0)$. The initial stack configuration $w_{in} = L0$. Two initial transitions, (I0) and (I1), are introduced for $\Delta_0$ and $\Delta_1$, respectively.

$$(\langle (0, 0), L0 \rangle, \langle (0, 0), L1 \rangle) \quad (I0)$$

$$(\langle (0, 0), L0 \rangle, \langle (0, 0), L4 \rangle) \quad (I1)$$

Thread 0 and thread 1 use transitions (I0) and (I1) to move to their first instructions respectively.

The remainder of the transitions in $\Delta_0$ are shown below.

$$(\langle (0, task), L1 \rangle, \langle (0, task), L2 \rangle) \quad (1)$$

$$(\langle (m, task), L2 \rangle, \langle (m, task), L7 \cdot L3 \rangle) \quad (2)$$

$$(\langle (m, task), L3 \rangle, \langle (1, task), L1 \rangle) \quad (3)$$

$$(\langle (m, task), L7 \rangle, \langle (m, 0), \epsilon \rangle) \quad (4)$$

$$(\langle (m, task), L7 \rangle, \langle (m, 1), \epsilon \rangle) \quad (5)$$

A compact notation has been used in describing the transitions above. Each of (1) through (5) denotes a set of transitions for each value of m and task, where m and task range over the set {0, 1}.

The transition relation $\Delta_1$ for thread 1 can be defined analogously.

Example 22

Exemplary Bounded Reachability

A configuration c is generally called reachable if and only if $c_{in} \rightarrow^*_p c$, where $c_{in}$ is the initial configuration. The reachability problem for concurrent pushdown systems is undecidable. However, bounding the number of context switches allowed in a transition generally leads to a decidable restriction of the reachability problem. For a positive natural number k, the k-bounded transition relation is defined as $$\xrightarrow{K}$$

on configurations c inductively, as follows:

$$c \xrightarrow{1} c'$$

iff $\exists i.\ c \rightarrow_i^* c'$ $$c \xrightarrow{k+1} c'$$

iff there exists c" and i such that $$c \xrightarrow{k} c'' \text{ and } c'' \longrightarrow_i^* c'$$

Thus, a k-bounded transition contains at most k−1 "context switches" in which a new relation $\rightarrow_i$ can be chosen. Notice that the full transitive closure of each transition relation $\rightarrow_i$ applied within each context. It can be said that a configuration c is k-reachable if $$c_{in} \xrightarrow{K} c.$$

The k-bounded reachability problem for a concurrent pushdown system P is:

Given configurations to $c_0$ and $c_1$, is it the case that $$c_0 \xrightarrow{K} c_1?$$

Example 23

Exemplary Aggregate Configurations

For a fixed k, the lengths and state spaces of k-bounded transition sequences may be unbounded, since each constituent transition relation $\to^*_i$ may generate infinitely many transitions containing infinitely many distinct configurations. Therefore, decidability of k-bounded reachability requires an argument. In order to formulate this argument, a transition relation is defined over aggregate configurations of the form $\langle\langle g, R_0, \ldots, R_N \rangle\rangle$, where $R_i$ are regular subsets of $\Gamma^*$.

For a global state $g \in G$ and a regular subset $R \subseteq \Gamma^*$, one should let $\langle\langle g, R \rangle\rangle$ denote the following set of configurations:

$$\langle\langle g, R \rangle\rangle = \{ \langle g, w \rangle | w \in R \}$$

Notice that $\langle\langle g, 0 \rangle\rangle = 0$. For $G = \{g_1, \ldots, g_m\}$, any regular set of configurations $S \subseteq G \times \Gamma^*$, can be written as a disjoint union $$S = \biguplus_{i=1}^{m} \langle\langle g_i, R_i \rangle\rangle \quad (1)$$

for some regular sets of stacks $R_i \subseteq \Gamma^*$, $i = 1 \ldots m$ (if there is no configuration with global state $g_j$ in S, then we take $R_j = 0$.) By Theorem 1, the set $Post_A^*(S)$ for regular S can also be written in the form (1), since it is a regular set. One can denote that $\langle\langle g', R' \rangle\rangle$ is a component of the set $Post_A^*(S)$ as represented in the form (1), writing $$\langle\langle g', R' \rangle\rangle \in Post_A^*(S)$$

if and only if $Post_A^*(S) = \biguplus_{i=1}^{m} \langle\langle g_i, R_i \rangle\rangle$ with $\langle\langle g', R' \rangle\rangle = \langle\langle g_j, R_j \rangle\rangle$ for some $j \in \{1, \ldots, m\}$.

Given a concurrent pushdown system $P = (G, \Gamma, \Delta_0, \ldots, \Delta_N, g_{in}, w_{in})$ one can define relations $\Rightarrow$ on aggregate configurations, for $i = 0 \ldots N$, by:

$$\langle\langle g, R_0, \ldots, R_i, \ldots R_N \rangle\rangle \Rightarrow$$

$$\langle\langle g', R_0, \ldots, R'_i, \ldots, R_N \rangle\rangle$$

if and only if $$\langle\langle g', R'_i \rangle\rangle \in Post_{\Delta_i}^*(\langle\langle g, R_i \rangle\rangle).$$

Finally, one can define the transition relation $\Rightarrow$ on aggregate configurations by the union of the $\Rightarrow_i$ i.e., $\Rightarrow = (\cup_{i=0}^{N} \Rightarrow_i)$. For aggregate configurations $a_1$ and $a_2$, one can write $a_1 \stackrel{k}{\Rightarrow} a_2$ if and only if there exists a transition sequence using starting at $a_1$ and ending at $a_2$ with at most k transitions. Notice that each relation $\Rightarrow_i$ contains the full transitive closure computed by the $Post_{\Delta_i}^*$ operator.

The following theorem reduces k-bounded reachability in a concurrent pushdown system to repeated applications of the sequential Post* operator:

Theorem 2: Let a concurrent pushdown system $P = (G, \Gamma, \Delta_0, \ldots, \Delta_N, g_{in}, w_{in})$ be given. Then, for any k, $$\langle g, w_0, \ldots, w_N \rangle \stackrel{k}{\Rightarrow} \langle g', w'_0, \ldots, w'_N \rangle$$

if and only if $$\langle\langle g, \{w_0\}, \ldots, \{w_N\} \rangle\rangle \stackrel{k}{\Rightarrow} \langle\langle g', R'_0, \ldots, R'_N \rangle\rangle$$

for some $R'_0, \ldots, R'_N$ such that $w'_i \in R'_i$ for all $i \in \{0, \ldots, N\}$.

Example 24

Exemplary Algorithm

Theorem 1 and Theorem 2, described above, together give rise to an algorithm for solving the context-bounded reachability problem for concurrent pushdown systems. The algorithm is shown in Table 4.

TABLE 4

Algorithm

Input: Concurrent pushdown system $(G, \Gamma, \Delta_0, \ldots, \Delta_N, g_{in}, w_{in})$ and bound k
0. let $A_{in} = (Q, \Gamma, \delta, \{g_{in}\}, F)$ such that $L(A_{in}) = \{ \langle g_{in}, w_{in} \rangle \}$;
1. WL := $\{(\langle g, A_{in}, \ldots, A_{in} \rangle, 0)\}$; //There are N copies of $A_{in}$.
2. Reach := $\{\langle g, A_{in}, \ldots, A_{in} \rangle \}$;
3. while (WL not empty)
4.   let $(\langle g, A_0, \ldots, A_N \rangle, i)$ = REMOVE(WL) in
5.     if (i < k)
6.       forall (j = 0 … N)
7.         let $A'_j = Post_{\Delta_j}^*(A_j)$ in
8.         forall (g' $\in G(A'_j))$ {
9.           ADD(WL,$(\langle g', RENAME(A_0, g'), \ldots,$ ANONYMIZE$(A'_j, g'), \ldots,$ RENAME$(A_N, g') \rangle, i + 1)$);
10.           Reach := Reach $\cup$ $\{\langle g',$ RENAME$(A_0, g'), \ldots,$ ANONYMIZE$(A'_j, g'), \ldots,$ RENAME$(A_N, g') \rangle$
        }
Output: Reach The algorithm processes a worklist WL containing a set of items of the form $(\langle g, A_0, \ldots, A_N \rangle, i)$, where $g \in G$ is a global state, the $A_j$ are pushdown store automata, and i is an index in the range $\{0, \ldots, k-1\}$. The operation REMOVE(WL) removes an item from the worklist and returns the item; ADD(WL, item) adds the item to the worklist. The initial pushdown store automaton $A_{in} = (Q, \Gamma, \delta, \{g_{in}\}, F)$ has initial state $g_{in}$ and accepts exactly the initial configuration $(g_{in}, w_{in})$. In the line numbered 6 of the algorithm in Table 4, the pushdown store automaton $A'_j = Post_{\Delta_j}^*(A_j)$ is understood to be constructed according to Theorem 1 so that $L(A'_j) = Post_{\Delta_j}^*(L(A_j))$. In line 8, $G(A'_j) = \{g' | \exists w. \langle g', w \rangle \in L(AN, g')\}$. All pushdown store automata $A_j$ constructed by the algorithm have at most one start state $g \in G$. When applied to such an automaton RENAME(A, g') returns the result of renaming the start state if any of A to g'. The operation ANONYMIZE(A, g') is obtained from A by renaming all states of A except g' to fresh states that are not in G.

The algorithm in Table 4 works by repeatedly applying the Post* operator to regular pushdown store automata that represent components in aggregate configurations. The operations RENAME and ANONYMIZE are necessary for applying Theorem 1 repeatedly, since the construction of pushdown store automata uses elements of G as states in these automata. In order to avoid confusion between such states across iterated applications of Theorem 1, renaming of states from G is necessary. Because of this renaming, successive pushdown store automata constructed by the algorithm in Table 4 may grow for increasing values of the bound k. The fact that the pushdown store automata could grow unboundedly for ever increasing k underlies the undecidability of the unbounded reachability problem.

Theorem 3 Let a concurrent pushdown system $P = (G, \Gamma, \Delta_0, \ldots, \Delta_N, g_{in}, w_{in})$ be given. For any k, the algorithm in Table 4 terminates on input P and k, and $$\langle\langle g_{in}, \{w_{in}\}, \ldots, \{w_{in}\} \rangle\rangle \stackrel{k}{\Rightarrow} \langle\langle g', R'_0, \ldots, R'_N \rangle\rangle$$

if and only if the algorithm outputs Reach with $\langle g', A'_0, \ldots, A'_N \rangle \in$ Reach such that and $L(A'_i) \langle\langle g', R'_i \rangle\rangle$ for all $i \in \{0, \ldots, N\}$.

Termination of the algorithm follows from the fact that the ADD statement in line 9 can only be executed a bounded number of times. One should let Count(i) denote the number of times ADD is called in line 9 with index argument i. Then, Count(0) = 1 and Count(i+1) = N×|G|×Count(i), since the loops in line 6 and 8 are bounded by N and |G|, respectively. Hence, Count(i+1)≦(N×|G|)$^i$ is bounded for all i. Since an item is removed in each iteration of the while loop at line 4, it follows that the worklist eventually becomes empty and the algorithm terminates.

The algorithm computes reachability for the given pushdown system with k-bounded contexts by computing the reachability relation $\overset{k}{\Rightarrow}$ over aggregate configurations represented by pushdown store automata. Reachable aggregate configurations (g', R'$_0$, ..., R'$_N$) are represented by pushdown store automata in the worklist items by the vectors (g, A'$_0$, ..., A'$_N$) and are collected in the set Reach. The theorem follows from Theorem 1, which implies that the automata constructed in line 7 of the algorithm correctly represent components of aggregate configurations.

Theorem 2 together with Theorem 3, described above, together imply that the algorithm in Table 4 solves the context-bounded model-checking problem, since Theorem 2 shows that aggregate configurations correctly represent reachability in the relation $\overset{k}{\Rightarrow}$.

For a concurrent pushdown system P=(G, Γ, Δ$_0$, ..., Δ$_N$, g$_{in}$, w$_{in}$), one can measure the size of P by |P|=max(|G|, |Δ|, |Γ|). For a pushdown store automaton A=(Q, Γ, δ, I, F), one can measure the size of A by |A|=max(|Q|, |δ|, |Γ|).

Theorem 4 For a concurrent pushdown system P=(G, Γ, Δ$_0$, ..., Δ$_N$, g$_{in}$, w$_{in}$) and a bound k, the algorithm in FIG. 3 decides the k-bounded reachability problem in time $O(k^3(N|G|)^k|P|^5)$.

The Post* operation on a set represented by A can be computed in time $O(|P|^2|A|+|P|^3)$. One should let A(i) denote the size of automaton A as extended by successive applications of the Post* operator throughout the iterations of the algorithm. It can be seen that $A(i) \leq c+i|P|\times i|P|\times |P|=O(i^2|P|^3)$, where the terms i|P| come from the number of states of the automaton, and |P| bounds the number of labeled edges in its transition relation. Therefore, the time to compute Post* at index i is bounded by $Cost(i)=O(|P|^2\times i^2|P|^3+|P|^3)=O(i^2|P|^5)$. With Items(i) denoting the number of work items with index i created throughout a run of the algorithm, one has Items(0)=1 and Items(i+1)=N|G|×Items(i)=(N|G|)$^i$. Summing over i=1...k iterations, the total cost of the algorithm is dominated by $\Sigma_{i=1}^{k}(N|G|)^i \times Cost(i)=O(k^3(N|G|)^k|P|^5)$.

Example 25

Exemplary Dynamic Concurrent Pushdown Systems

In the example, a dynamic concurrent pushdown system is defined with operations for forking and joining on a thread. To allow for dynamic fork join parallelism, program variables in which thread identifiers can be stored are allowed. Thread identifiers are members of the set Tid={0, 1, 2, ... }. The identifier of a forked thread may be stored by the parent thread in such a variable. Later, the parent thread may perform a join on the thread identifier contained in that variable.

Formally, a dynamic concurrent pushdown system is a tuple (GBV, GTV, LBV, LTV, Δ, Δ$_F$, Δ$_J$, g$_{in}$, γ$_{in}$).

The various components of this tuple are described below.

GBV is the set of global variables containing Boolean values and GTV is the set of global variable containing thread identifiers. Let G be the (infinite) set of all valuations to the global variables.

LBV is the set of local variables containing Boolean values and LTV is the set of local variables containing thread identifiers. Let F be the (infinite) set of all valuations to the local variables.

Δ⊆(G×Γ)×(G×Γ*) is the transition relation describing a single step of any thread.

Δ$_F$⊆Tid×(G×Γ)×(G×Γ*) is the fork transition relation. If (t, ⟨g, γ⟩, ⟨g', w⟩)∈Γ$_F$, then in the global store g a thread with γ at the top of its stack may fork a thread with identifier t modifying the global store to g' and replacing γ at the top of the stack with w.

Δ$_J$⊆LTV×(G×Γ)×(G×Γ*) is the join transition relation. If (x, ⟨g, γ⟩, ⟨g', w⟩)∈Δ$_J$, then in the global store g a thread with γ at the top of its stack blocks until the thread with identifier γ(x) finishes execution. On getting unblocked, this thread modifies the global store to g' and replaces γ at the top of the stack with w.

g$_{in}$ is a fixed valuation to the set of global variables such that g$_{in}$(x)=0 for all x∈GTV.

γ$_{in}$ is a fixed valuation to the set of local variables such that γ$_{in}$(x)=0 for all x∈LTV.

TABLE 5

Domains

| | | | |
|---|---|---|---|
| ss | ∈ | Stacks = Tid → (Γ ∪ {$})* | |
| c | ∈ | C = G × Tid × Stacks | Configuration |
| ⤳ | ∈ | C × C | |

Every dynamic concurrent pushdown system is equipped with a special symbol $∉Γ to mark the bottom of the stack of each thread. A configuration of the system is a triple (g, n, ss), where g is the global state, n is the identifier of the last thread to be forked, and ss(t) is the stack for thread t∈Tid. The execution of the dynamic concurrent pushdown system starts in the configuration ⟨g$_{in}$, 0, ss$_0$⟩, where ss(t)=γ$_{in}$$ for all t∈Tid. The rules shown below define the transitions that may be performed by thread t from a configuration ⟨g, n, ss⟩.

TABLE 6

Operational Semantics (SEQ)

$$\frac{t \leq n \quad ss(t) = \gamma w' \quad (\langle g, \gamma \rangle, \langle g', w \rangle) \in \Delta}{\langle g, n, ss \rangle \leadsto_t \langle g', n, ss[t := ww'] \rangle}$$

(SEQEND)

$$\frac{t \leq n \quad ss(t) = \$}{\langle g, n, ss \rangle \leadsto_t \langle g, n, ss[t := \epsilon] \rangle}$$

(FORK)

$$\frac{t \leq n \quad ss(t) = \gamma w' \quad (n+1, \langle g, \gamma \rangle, \langle g', w \rangle) \in \Delta_F}{\langle g, n, ss \rangle \leadsto_t \langle g', n+1, ss[t := ww'] \rangle}$$

(JOIN)

$$\frac{t \leq n \quad ss(t) = \gamma w' \quad x \in LTV \quad (x, \langle g, \gamma \rangle, \langle g', w \rangle) \in \Delta_J \quad ss(\gamma(x)) = \epsilon}{\langle g, n, ss \rangle \leadsto_t \langle g', n, ss[t := ww'] \rangle}$$

In the example, all rules are guarded by the condition t≦n indicating that thread t must have already been forked. Thus, only thread 0 can make a move from the initial configuration ⟨g$_{in}$, 0, ss$_0$⟩. The rule (SEQ) allows thread t to perform a transition according to the transition relation Δ. The rule (SEQEND) is enabled if the top (and the only) symbol on the stack of thread t is $. The transition pops the $ symbol from the stack of thread t without changing the global state so that thread t does not perform anymore transitions. The rule (FORK) creates a new thread with identifier n+1. The rule (JOIN) is enabled if thread γ(x), where γ is the symbol at the top of the stack of thread t, has terminated. The termination of a thread is indicated by an empty stack.

TABLE 7

Example Dynamic Thread Creation

```
boolean task = 0;
Thread 0
Tid t;
while(1) {
  L1: InitTask( );
  L2: t:= async DoTask( );
  L3: join(t);
}
InitTask( ) {                    DoTask( ) {
  L7: task := {0, 1};              L8: task := ¬task;
}
```

Table 7 shows an example of dynamic thread creation. This example replaces the mutex-based synchronization of the example in Table 2 with fork join synchronization. To model dynamic thread creation, introduce a (ghost) global variable inpc is introduced which takes values from the set PC. This variable contains the program label of a thread when it is forked. This program is represented as a dynamic concurrent pushdown system:

$$(\{task, inpc\}, 0, \{p\}, \{t\}, \Delta, \Delta_F, \Delta_J, g_{in}, \gamma_{in}).$$

The initial global state $g_{in}=(0, L1)$. The initial stack configuration $w_{in}=(0, L0)$. An initial transition (I) is introduced in Δ:

$$(\langle(task, inpc), (0, L0)\rangle, \langle(task, L0), (0, inpc)\rangle) \quad (I)$$

Each thread uses transitions (I) to move to its first instruction. The remainder of the transitions in Δ are:

$$(\langle(task, inpc), (t, L1)\rangle\langle(task, inpc), (0, L7)\cdot(t, L2)\rangle) \quad (1)$$

$$(\langle(task, inpc), (t, L7)\rangle, \langle(0, inpc), \in\rangle) \quad (2)$$

$$(\langle(task, inpc), (t, L7)\rangle, \langle(1, inpc), \in\rangle) \quad (3)$$

$$(\langle(task, inpc), (t, L8)\rangle, \langle(¬task, inpc), \in\rangle) \quad (4)$$

The transitions in $\Delta_F$ are:

$$(\langle tid, (task, L0), (t, L2)\rangle, \langle(task, L8), (tid, L3)\rangle) \quad (1)$$

The transitions in $\Delta_J$ are:

$$(\langle t, (task, inpc), (t, L3)\rangle, \langle(task, inpc), (t, L1)\rangle) \quad (1)$$

Example 26

Exemplary Assumptions

In concurrent programs with fork-join parallelism, the usage of thread identifiers (and consequently variables containing thread identifiers) is generally restricted. A thread identifier is generally created by a fork operation and stored in a variable. Then, it may be copied from one variable to another. Finally, a join operation may look at a thread identifier contained in such a variable. Usually, no control flow other than that implicit in a join operation depends on thread identifiers. The restricted use of thread identifiers in concurrent systems can be exploited to allow for one to devise an algorithm for solving the k-bounded reachability problem.

First, the assumptions about the restricted use of thread identifiers are formalized. A renaming function is a partial function from Tid to Tid. When a renaming function $f$ is applied to a global store g, it returns another store in which the value of each variable of type Tid is transformed by an application of $f$. If $f$ is undefined on the value of some global variable in g, it is also undefined on g. Similarly, a renaming function can be applied to a local store as well. A renaming function is extended to a sequence of local stores by pointwise application to each element of the sequence. Assumptions about the transition relations Δ, $\Delta_F$, and $\Delta_J$ are now formalized.

A1. For all g∈G, γ∈Γ, and renaming functions $f$ such that $f(g)$ and $f(\gamma)$ are defined, the following statements are true.
  1. If $(\langle g, \gamma\rangle, \langle g', w\rangle)\in\Delta$ then there exist $fg'\in G$ and $fw\in\Gamma^*$ such that $fg'=f(g'), fw=f(w)$, and $(\langle f(g), f(\gamma)\rangle, \langle fg', fw\rangle)\in\Delta$.
  2. If $(\langle f(g), f(\gamma)\rangle, \langle fg', fw\rangle)\in\Delta$ then there exist $g'\in G$ and $w\in\Gamma^*$ such that $fg'=f(g'), fw=f(w)$, and $(\langle g, \gamma\rangle, \langle g', w\rangle)\in\Delta$.

TABLE 8

Pictorial View of Assumption A1

$$\begin{array}{ccc} \langle g, \gamma\rangle & \xrightarrow{\Delta} & \langle g', w\rangle \\ \downarrow f & & \downarrow f \\ \langle f(g), f(\gamma)\rangle & \xrightarrow{\Delta} & \langle fg', fw\rangle \end{array}$$

Table 8 presents a pictorial view of assumption A1. This view shows four arrows, two horizontal labeled with the transition relation Δ and two vertical labeled with the renaming function $f$. The assumption expresses a requirement on tuples (g, γ) for which the left vertical arrow holds. A1.1 states that if the top horizontal arrow holds in addition, then the remaining two arrows hold. Conversely, A1.2 states that if the bottom horizontal arrow holds in addition, then the remaining two arrows hold. The transition relation Δ can be seen to satisfy A1 by the verification of it on each transition (I) and (1)-(4) separately.

A2. For all t∈Tid, g∈G, γ∈Γ, and renaming functions $f$ such that $f(t), f(g)$, and $f(\gamma)$ are defined, the following statements are true.
  1. If $(t, \langle g, \gamma\rangle, \langle g', w\rangle)\in\Delta_F$ then there exist $fg'\in G$ and $fw\in\Gamma^*$ such that $fg'=f(g'), fw=f(w)$, and $(f(t), \langle f(g), f(\gamma)\rangle, \langle fg', fw\rangle)\in\Delta_F$.
  2. If $(f(t), (f(t), \langle f(g), f(\gamma)\rangle, \langle fg', fw\rangle)\in\Delta_F$ then there were $g'\in G$ and $w\in\Gamma^*$ such that $fg'=f(g'), fw=f(w)$, and $(t, \langle g, \gamma\rangle, \langle g', w\rangle)\in\Delta_F$.

A3. For all x∈LTV, g∈G, γ∈Γ, and renaming functions $f$ such that $f(g)$ and $f(\gamma)$ are defined, the following statements are true.
  1. If $(x, \langle g, \gamma\rangle, \langle g', w\rangle)\in\Delta_J$ then there exist $fg'\in G$ and $fw\in\Gamma^*$ such that $fg'=f(g'), fw=f(w)$, and $(x, \langle f(g), f(\gamma)\rangle, \langle fg', fw\rangle)\in\Delta_J$.
  2. If $(x, \langle f(g), f(\gamma)\rangle, \langle fg', fw\rangle)\in\Delta_J$ then there exist $g'\in G$ and $w\in\Gamma^*$ such that $fg'=f(g'), fw=f(w)$, and $(x, \langle g, \gamma\rangle, \langle g', w\rangle)\in\Delta_J$.

Assumption A2 about $\Delta_F$ and A3 about $\Delta_J$ are similar in spirit to $\Delta$.

Example 27

Exemplary Reduction to Concurrent Pushdown Systems

In the example, how to reduce the problem of k-bounded reachability on a dynamic concurrent pushdown system to a concurrent pushdown system with k+1 threads is shown. Given a dynamic concurrent pushdown system P and a positive integer k, a concurrent pushdown system $P_k$ is produced, containing k+1 threads with identifiers in $\{0, 1 \ldots, k\}$ such that it suffices to verify the k-bounded executions of $P_k$.

An insight of this approach is that in a k-bounded execution, at most k different threads may perform a transition. It is desirable to simulate transitions of these k threads with transitions of threads in $P_k$ with identifiers in $\{0, \ldots, k-1\}$. The last thread in $P_k$ with identifier k never performs a transition; it exists only to simulate the presence of the remaining threads in P.

Let $Tid_k = \{0, \ldots, k\}$ be the set of the thread identifiers bounded by k. Let $AbsG_k$ and $Abs\Gamma_k$ be the set of all valuations to global and local variables respectively, where the variables containing thread identifiers only take values from $Tid_k$. Note that both $AbsG_k$p and $Abs\Gamma_k$ are finite sets.

Given a dynamic concurrent pushdown system $$P = (GBV, GTV, LBV, LTV, \Delta, \Delta_F, \Delta_J, g_{in}, \gamma_{in})$$

and a positive integer k, a concurrent pushdown system is defined:

$$P_k = ((AbsG_k \times Tid_k \times P(Tid_k)),$$
$$(Abs\Gamma_k \cup \{\$\}), \Delta_0, \Delta_1, \ldots, \Delta_k, (g_{in}, 0, 0), \gamma_{in}\$).$$

The concurrent pushdown system $P_k$ has k+1 threads. A global state of $P_k$ is 3-tuple $(g, n, \alpha)$, where g is a valuation to the global variables, n is the largest thread identifier whose corresponding thread is allowed to make a transition, and $\alpha$ is the set of thread identifiers whose corresponding threads have terminated. The initial global state is $(g_{in}, 0, 0)$, which indicates that initially only thread 0 can perform a transition and no thread has finished execution. The rules in Table 9 define the transitions in the transition relation $\Delta_t$ of thread.

TABLE 9

Definition of $\Delta$ (ABSSEQ)
$$\frac{t \leq n \quad (\langle g, \gamma \rangle, \langle g', w \rangle) \in \Delta}{(\langle (g, n, \alpha), \gamma \rangle, \langle (g', n, \alpha), w \rangle) \in \Delta_t}$$

(ABSSEQEND)
$$\frac{t \leq n}{(\langle (g, n, \alpha), \$ \rangle, \langle (g, n, \alpha \cup \{t\}), \epsilon \rangle) \in \Delta_t}$$

(ABSFORK)
$$\frac{t \leq n \quad n+1 < k \quad (n+1, \langle g, \gamma \rangle, \langle g', w \rangle) \in \Delta_F}{(\langle (g, n, \alpha), \gamma \rangle, \langle (g', n+1, \alpha), w \rangle) \in \Delta_t}$$

(ABSFORKNONDET)

TABLE 9-continued

Definition of $\Delta$ $$\frac{t \leq n \quad (k, \langle g, \gamma \rangle, \langle g', w \rangle) \in \Delta_F}{(\langle (g, n, \alpha), \gamma \rangle, \langle (g', n, \alpha), w \rangle) \in \Delta_t}$$

(ABSJOIN)
$$\frac{t \leq n \quad x \in LTV \quad (x, \langle g, \gamma \rangle, \langle g', w \rangle) \in \Delta_J \quad \gamma(x) \in \alpha}{(\langle (g, n, \alpha), \gamma \rangle, \langle (g', n, \alpha), w \rangle) \in \Delta_t}$$

The rules in Table 9 are guarded by the condition $t \leq n$ to indicate that no transition in thread t is enabled in $\langle (g, n, \alpha), \gamma \rangle$ if $t > n$. The rule (ABSSEQ) adds transitions in $\Delta$ to $\Delta_t$. The rule (ABSSEQEND) adds thread t to the set of terminated threads. The rules (ABSFORK) and (ABSFORKNONDET) handle thread creation in P and are the most crucial part of our transformation. The rule (ABSFORK) handles the case when the new thread being forked participates in a k-bounded execution. This rule increments the counter n allowing thread n+1 to begin simulating the newly forked thread. The rule (ABSFORKNONDET) handles the case when the new thread being forked does not participate in a k-bounded execution. This rule leaves the counter n unchanged thus conserving the precious resource of thread identifiers in $P_k$. Both these rules add the transitions of the forking thread in $\Delta_F$ to $\Delta$. Finally, the rule (ABSJOIN) handles the join operator by using the fact that the identifiers of all previously terminated threads are present in $\alpha$. Again, this rule adds the transitions of the joining thread in $\Delta_J$ to $\Delta$.

The correctness theorems for the transformation can now be stated. To simplify the notation required to state these theorems, a configuration $\langle (g', n', \alpha), \gamma \rangle, w_0, w_1, \ldots, w_k \rangle$ of $P_k$ as $\langle (g', n', \alpha), ss' \rangle$ is written, where ss' is a map from $Tid_k$ to $(Abs\Gamma_k \cup \$)^*$.

First, the transformation is sound, which means that by verifying $P_k$, one does not miss erroneous bounded executions of P.

Theorem 5 (Soundness): Let P be a dynamic concurrent pushdown system and k be a positive integer. Let (g, n, ss) be a k-reachable configuration of P. Then there is a total renaming function $f: Tid \to Tid_k$ and a k-reachable configuration $\langle (g', n', \alpha), ss' \rangle$ of the concurrent pushdown system $P_k$ such that $g' = f(g)$ and $ss'(f(j)) = f(ss(j))$ for all $j \in Tid$.

Second, the transformation is precise, which means that every erroneous k-bounded execution of $P_k$ corresponds to an erroneous execution of P.

Theorem 6 (Completeness): Let P be a dynamic concurrent pushdown system and k be a positive integer. Let $\langle (g', n', \alpha), ss' \rangle$ be a k-reachable configuration of the concurrent pushdown system $P_k$. Then there is a total renaming function $f: Tid \to Tid_k$ and a k-reachable configuration $\langle g, n, ss \rangle$ of P such that $g' = f(g)$ and $ss'(f(j)) = f(ss(j))$ for all $j \in Tid$.

Thus, with Theorem 5 and Theorem 6, the problem of k-bounded reachability on a dynamic concurrent pushdown system to a concurrent pushdown system with k+1 threads has been implemented.

Example 28

Exemplary Proof of Theorem 2

Lemma 1 Suppose that $$\langle g, w_0, \ldots, w_i, \ldots, w_N \rangle \rightarrow_i^* \langle g', w_0, \ldots, w_i', \ldots, w_N \rangle$$

with $\langle g, w_i \rangle \in \langle\langle g, R_i \rangle\rangle$. Then there exists R' such that $\langle\langle g', R'_i \rangle\rangle \in \text{Post}_{\Delta_i}^*(\langle\langle g, R_i \rangle\rangle)$ and $\langle g', w_i' \rangle \in \langle\langle g', R_i' \rangle\rangle$.

PROOF The assumption implies that $$\langle g, w_i \rangle \rightarrow_{\Delta_i}^* \langle g', w_i' \rangle$$

hence $$\langle g', w_i' \rangle \in \text{Post}_{\Delta_i}^*(\langle\langle g, R_i \rangle\rangle) \quad (2)$$

Writing $\text{Post}_{\Delta_i}^*(\langle\langle g', R_i \rangle\rangle)$ on the form (1) provides $$\text{Post}_{\Delta_i}^*(\langle\langle g, R_i \rangle\rangle) = \biguplus_{j=1}^{m} \langle\langle g'_j, R'_j \rangle\rangle$$

for some $R_1', \ldots R_m'$, where $G = \{g_1, \ldots g_m\}$. Since $g' = g_j$ for some $j \in \{1, \ldots, m\}$, it follows from (2) that $(g', w_i') \in (\langle g_j, R_i' \rangle)$, and one can chose $R' = R'_j$.

Lemma 2 Suppose that $$\langle g, w_0, \ldots w_N \rangle \xrightarrow{k} \langle g', w_0, \ldots w_N \rangle$$

Then $$\langle\langle g, \{w_0\}, \ldots, \{w_N\} \rangle\rangle \xRightarrow{k} \langle\langle g', R_0', \ldots, R_N' \rangle\rangle$$

for some $R_0', \ldots, R_N'$ such that $w_i' \in R_i'$ for all $i \in \{0, \ldots, N\}$.
PROOF By induction on $k \geq 1$. For $k=1$, the assumption is that $$\langle g, w_0, \ldots w_N \rangle \rightarrow_i^* \langle g', w_0, \ldots w_N \rangle$$

for some $i \in \{0, \ldots, N\}$, i.e., $$\langle g, w_0, \ldots, w_i, \ldots, w_N \rangle \rightarrow_i^* \langle g', w_0, \ldots, w_i', \ldots, w_N \rangle$$

Since $\langle g, w_i \rangle \in \langle\langle g, \{w_i\} \rangle\rangle$, Lemma 1 implies that $\langle g', w_i' \rangle \in \langle\langle g', R' \rangle\rangle$ for some $R'$ such that $\langle\langle g', R' \rangle\rangle \in \text{Post}_{\Delta_i}^*(\langle\langle g, \{w_i\} \rangle\rangle)$. By the definition of $\Rightarrow$ this shows that $$\langle\langle g, \{w_0\}, \ldots, \{w_i\}, \ldots, \{w_N\} \rangle\rangle \Rightarrow$$

$$\langle\langle g, \{w_0\}, \ldots, R', \ldots, \{w_N\} \rangle\rangle$$

which proves the lemma in the base case.
For the inductive case, assume $$\langle g, w_0, \ldots, w_i, \ldots, w_N \rangle \rightarrow^{[k+1]}$$

$$\langle g'', w''_0, \ldots, w_i'', \ldots, w_N'' \rangle$$

by the relations $$\langle g, w_0, \ldots, w_i, \ldots, w_N \rangle \rightarrow^{[k]}$$

$$\langle g', w_0', \ldots, w_i', \ldots, w_N' \rangle \quad (3)$$

and $$\langle g', w_0', \ldots, w_i', \ldots, w_N' \rangle \rightarrow_i^*$$

$$\langle g'', w_0'', \ldots, w_i'', \ldots, w_N'' \rangle \quad (4)$$

By induction hypothesis and (3), one has $$\langle\langle g, \{w_0\}, \ldots, \{w_i\}, \ldots, \{w_N\} \rangle\rangle \Rightarrow$$

$$\langle\langle g', R_0', \ldots, R_i', \ldots, R_N' \rangle\rangle \quad (5)$$

for some $R_0', \ldots, R_N'$ such that $w_j' \in R_j'$ for all $j \in \{0, \ldots, N\}$. Since one has $\langle g', w_i' \rangle \rightarrow_{\Delta_i}^* \langle g'', w_i'' \rangle$ by (4) and $w_i' \in R_i'$, it follows that $\langle\langle g', w_i' \rangle\rangle \in \langle\langle g', R_i' \rangle\rangle$. Lemma 1 then shows that one has $\langle\langle g'', w_i'' \rangle\rangle \in \langle\langle g'', R_i'' \rangle\rangle$ for some $R_i''$ such that $\langle\langle g'', R_i'' \rangle\rangle \in \text{Post}_{\Delta_i}^*(\langle\langle g', R_i' \rangle\rangle)$. It follows that one has $$\langle\langle g', R_0', \ldots, R_i', \ldots, R_N' \rangle\rangle \Rightarrow \quad (6)$$

Composing (5) and (6) yields $$\langle\langle g, \{w_0\}, \ldots, \{w_i\}, \ldots, \{w_N\} \rangle\rangle \xRightarrow{k}$$

thereby proving the lemma in the inductive case.

Lemma 3 Suppose that $$\langle\langle g, R_0, \ldots, R_i, \ldots, R_N \rangle\rangle \Rightarrow \langle\langle g', R_0, \ldots, R_i', \ldots, R_N \rangle\rangle$$

Then, for all $w_i' \in R_i'$ there exists $w_i \in R_i$ such that $$\langle g, w_0, \ldots, w_i, \ldots, w_N \rangle \rightarrow_i^* \langle g', w_0, \ldots, w_i', \ldots, w_N \rangle$$

for all $w_j \in R_j$, $j \in \{0, \ldots, i+1, \ldots, N\}$.
PROOF By the assumption one has $$\langle\langle g', R' \rangle\rangle \in \text{Post}_{\Delta_i}^*(\langle\langle g, R_i \rangle\rangle)$$

Hence, one can write $$\langle\langle g', R_i' \rangle\rangle = \{\langle g', w_i' \rangle | \exists \langle g, w_i \rangle \in \langle\langle g, R_i \rangle\rangle.$$
$$\langle g, w_i \rangle \rightarrow_{\Delta_i}^* \langle g', w_i' \rangle\}$$

which shows that, for all $w_i' \in R_i'$, there exists $w_i$ such that $$\langle g, w_i \rangle \rightarrow_{\Delta_i}^* \langle g', w_i' \rangle$$

The lemma now follows from the definition of the transition relation $\rightarrow_i^*$.

Lemma 4 Let strings $w_0, \ldots, w_N$ and $w'_0, \ldots, w'_N$ be given. Assume that $$\langle\langle g, \{w_0\}, \ldots, \{w_i\}, \ldots, \{w_N\} \rangle\rangle \xRightarrow{k} \langle\langle g', R_0', \ldots, R_N' \rangle\rangle$$

for some $R_0', \ldots, R_N'$ such that $w_i' \in R_i'$ for all $i \in \{0, \ldots, N\}$. Then $$\langle g, w_0, \ldots, w_n \rangle \xrightarrow{k} \langle g', w_0', \ldots, w_N' \rangle$$

PROOF By induction on $k \geq 1$. For the base case, $k=1$, the assumption yields:

$$\langle\langle g, \{w_0\}, \ldots, \{w_i\}, \ldots, \{w_N\} \rangle\rangle \Rightarrow$$

$$\langle\langle g', \{w_0\}, \ldots, R_i', \ldots, \{w_N\} \rangle\rangle$$

for some i and $R_i'$ with $w_i' \in R_i'$. Then, by Lemma 3, there exists $w_i'' \in \{w_i\}$ such that $$\langle g, w_1, \ldots, w_i'', \ldots, w_N \rangle \rightarrow_i^* \langle g, w_1, \ldots, w_i', \ldots, w_N \rangle$$

holds. Since one must have $w_i'' = w_i$ by the choice of $w_i''$, the lemma follows.

For the inductive case, assume $$\langle\langle g, \{w_0\}, \ldots, \{w_N\} \rangle\rangle \xRightarrow{k+1} \langle\langle g', R_0', \ldots, R_N' \rangle\rangle$$

with $w_i' \in R_i'$ for all $i \in \{0, \ldots, N\}$. Then, for some $j \in \{0, \ldots, N\}$ and $g''$, one has $$\langle\langle g, \{w_0\}, \ldots, \{w_N\}\rangle\rangle \overset{k}{\Rightarrow}$$

$$\langle\langle g'', R_0', \ldots, R_j', \ldots, R_N'\rangle\rangle \quad (7)$$

and, for some $j \in \{0, \ldots, N\}$ and $R''$, one has $$\langle\langle g'', R_0', \ldots, R_{j-1}', R'', R_{j+1}', \ldots, R_N'\rangle\rangle \Rightarrow$$

$$\langle\langle g', R_0', \ldots, R_{j-1}', R_j', R_{j+1}', \ldots, R_N'\rangle\rangle \quad (8)$$

By induction hypothesis and (7) one has $$\langle g, w_0, \ldots, w_n\rangle \overset{k}{\to} \langle g'', w_0', \ldots, w_{j-1}', w'', w_{j+1}', \ldots w_N'\rangle \quad (9)$$

for all $w'' \in R''$. Lemma 3 applied to (8) implies that, for all $w_j'' \in R_j''$ there exists $w''' \in R''$ such that $$\langle g'', w_0', \ldots, w_{j-1}', w''', w_{j+1}', \ldots, w_N'\rangle \to_j^*$$

$$\langle g', w_0', \ldots, w_{j-1}', w_j', w_{j+1}', \ldots, w_N'\rangle \quad (10)$$

holds for all $w_i' \in R_i'$ for $i \in \{0, \ldots j-1, j+1, \ldots, N\}$. Because (9) holds for all $w'' \in R''$, it holds for $w'''$ in particular. Hence, composing (9) and (10) proves the lemma.

Theorem 2 Let a concurrent pushdown system $P=(G, \Gamma, \Delta_0, \ldots, \Delta_N, \langle g_{in}, w_{in}\rangle)$ be given. Then, for any k, $$\langle g, w_0, \ldots, w_N\rangle \overset{k}{\Rightarrow} \langle g', w_0', \ldots, w_0'\rangle$$

if and only if $$\langle\langle g, \{w_0\}, \ldots, \{w_N\}\rangle\rangle \overset{k}{\Rightarrow} \langle\langle g', R_0', \ldots, R_N'\rangle\rangle$$

for some $R_0', \ldots, R_N'$ such that $w_i' \in R_i'$ for all $i \in \{0, \ldots, N\}$.

PROOF The theorem follows directly from Lemma 2 and Lemma 4.

Example 29

Exemplary Proofs of Theorem 5 and Theorem 6

A dynamic concurrent pushdown system P, a positive integer k, and the concurrent pushdown system $P_k$ are fixed. Each configuration (g, n, ss) of P is augmented to (c, g, n, ss), where c is a subset of Tid. This subset predicts at the beginning of an execution the identifie ⤳ the threads that may perform a transiti ⤳ any point in the execution. It is initialized nondeterministically and remains unchanged throughout the execution of the system. The transition relation is extended in the obvious way so that if (c, g, n, ss) (c, g', n', ss') then $t \in c$. Every execution over the original configurations can be matched by an execution over the augmented configurations by choosing an appropriate initial value of c. In addition, for every k-bounded execution, a choice of c can be made such that $0 \in c$ and $|c| \leq k$. Henceforth, it is assumed that the set c in the augmented configurations of k-bounded execution sequences satisfies the above property.

Lemma 5 For every reachable configuration $\langle c, g, n, ss\rangle$ of P, we have $ss(t)=\gamma_0\$$ for all $t \in$ Tid such that $t>n$.

PROOF The proof is by induction on the length of the execution sequence leading to $\langle c, g, n, ss\rangle$.

Lemma 6 For every reachable configuration $\langle(g, n, \alpha), ss\rangle$ of $P_k$, we have $ss(t)=\gamma_0\$$ for all $t \in Tid_k$ such that $t>n$.

PROOF The proof is by induction on the length of the execution sequence leading to $\langle(g, n, \alpha), ss\rangle$.

Lemma 7 For every reachable configuration $\langle(g, n, \alpha), ss\rangle$ of $P_k$, we have $t \in \alpha$ iff $ss(t) = \in$ for all $t \in Tid_k$.

PROOF The proof is by induction on the length of the execution sequence leading to $\langle(g, n, \alpha), ss\rangle$.

Lemma 8 For every k-bounded execution $\langle c, \mathbin{⤳} ss_0\rangle \langle c, g_1, n \mathbin{⤳} \langle c, g_l, n_l, ss_l\rangle$ of P, there is a renaming function $f\colon Tid \to Tid_k$ and an execution $\langle(g_0', n_0', \alpha_0), ss_0'\rangle \to_{t_1'} \langle(g_1', n_1', \alpha_1), ss_1'\rangle \to_{t_2'} \ldots \to_{t_l'} \langle(g_l', n_l', \alpha_l), ss_l'\rangle$ of $P_k$ such that the following statements are true:

1. $dom(f) = \{t \in Tid | 0 \leq t \leq n_l\}$.
2. The function $f$ maps $dom(f) \cap c$ one-one onto $\{t \in Tid | 0 \leq t \leq n_l'\}$ and $dom(f) \backslash c$ to k.
3. $g_l' = f(g_l)$
4. For all $t \in dom(f)$, $ss_l'(f(t)) = f(ss_l(t))$.

PROOF The proof is done by induction over the length l of the k-bounded execution sequence of the dynamic concurrent pushdown system.

Base case (l=0): Let $f$ be such that $f(0)=0$ and $f$ is undefined elsewhere. It is known that $n_0 = 0$ and $n_0'$. Therefore $dom(f) = \{t \in Tid | 0 \leq t \leq n_l\}$ and $f$ maps $dom(f)$ one-one onto $\{t \in Tid | 0 \leq t \leq n_l'\}$. From the property of $g_0$, we get that $g_0' = f(g_0) = g_0$. From the property of $\gamma_0$, one can get that $\gamma_0' = f(\gamma_0) = \gamma_0$. Therefore $ss_0'(f(0)) = ss_0'(0) = \gamma_0\$ = ss_0(0)$.

Inductive case: It is assumed that the theorem holds for l with a renaming function $f$. One can now prove the theorem for l+1 by a case analysis.

(SEQ): One has $\langle c, g_l, n_l, ss_l\rangle \mathbin{⤳} \langle c, g_{l+1}, n_l, ss_l[t_{l+1}:=ww']\rangle$, where $t_{l+1} \in c$, $t_{l+1} \leq n_l$, $ss_l(t_{l+1}) = \gamma w'$, and $(\langle g_l, \gamma\rangle, \langle g_{l+1}, w\rangle) \in \Delta$. By the induction hypothesis, one has $dom(f) = \{t \in Tid | 0 \leq t \leq n_l\}$. Therefore $t_{l+1} \in dom(f) \cap c$ and by the induction hypothesis, we get $f(t_{l+1}) \leq n_l'$. Let $t'_{l+1} = f(t_{l+1})$. By Assumption A1.1, one has $(\langle f(g_l), f(\gamma)\rangle, \langle f(g_{l+1}), f(w)\rangle) \in \Delta$. By rule (ABSSEQ), one gets $(\langle(f(g_l), n_l', \alpha_l), f(\gamma)\rangle, \langle(f(g_{l+1}), n_l', \alpha_l), f(w)\rangle) \in \Delta_{t_{l+1}'}$. By the induction hypothesis, one has $ss_l'(t'_{l+1}) = f(ss_l(t_{l+1})) = f(\gamma)f(w')$. Therefore, one has $\langle(f(g_l), n_l', \alpha_l), ss_l'\rangle \to_{t_{l+1}'} \langle(f(g_{l+1}), n_l', \alpha_l), ss_l'[t_{l+1}':=f(w)f(w')]\rangle$.

(SEQEND): One has $\langle c, g_l, n_l, ss_l\rangle \mathbin{⤳} \langle c, g_l, n_l, ss_l[t_{l+1}:=\in]\rangle$, where $t_{l+1} \in c$, $t_{l+1} \leq n_l$ and $ss_l(t_{l+1}) = \$$. By the induction hypothesis, one has $dom(f) = \{t \in Tid | 0 \leq t \leq n_l\}$. Therefore $t_{l+1} \in dom(f) \cap c$ and by the induction hypothesis, one gets $f(t_{l+1}) \leq n_l'$. Let $t'_{l+1} = f(t_{l+1})$. By rule (ABSSEQEND) one gets $(\langle(g_l, n_l', \alpha_l), \$\rangle, \langle(g_l, n_l', \alpha_l \cup \{t_{l+1}'\}), \in\rangle) \in \Delta_{t_{l+1}'}$. By the induction hypothesis, one has $ss_l'(t_{l+1}') = f(ss_l(t_{l+1})) = f(\$) = \$$. Therefore, one has $\langle(g_l, n_l', \alpha_l)ss_l'\rangle \to_{t_{l+1}'} \langle(g_l, n_l', \alpha_l \cup \{t_{l+1}'\}), ss_l'[t_{l+1}':=\in]\rangle$.

(FORK): We have $\langle c, g_l, n_l, ss_l\rangle \mathbin{⤳} \langle c, g_{l+1}, n_l+1, ss_l[t_{l+1}:=ww']\rangle$, where $t_{l+1} \in c$, $t_{l+1} \leq n_l$, $ss_l(t_{l+1}) = \gamma w'$, and $(n_l+1, \langle g_l, \gamma\rangle, \langle g_{l+1}, w\rangle) \in \Delta_F$. By the induction hypothesis, one has $dom(f) = \{t \in Tid | 0 \leq t \leq n_l\}$. Therefore, $t_{l+1} \in dom(f) \cap c$ and by the induction hypothesis, one gets $f(t_{l+1}) \leq n_l'$. Let $t_{l+1}' = f(t_{l+1})$. There are two cases:

1. $(n_l+1 \in c)$: Since $|c| \leq k$, $n_l+1 \in dom(f)$, and $n_l+1 \in c$, one has $|dom(f) \cap c| < k$. Therefore $|\{t \in Tid | 0 \leq t \leq n_l'\}| = dom(f) \cap c| < k$, which implies that $n_l'+1 < k$. One can extend the renaming function $f$ so that $f(n_l+1) = n_l'+1$. By Assumption A2.1, one has $(n_l'+1, \langle f(g_l), f(\gamma)\rangle, \langle f(g_{l+1}), f(w)\rangle) \in \Delta_F$. By rule (ABSFORK), one gets $(\langle(f(g_l), n_l', \alpha_l), f(\gamma)\rangle, \langle(f(g_{l+1}), n_l'+1, \alpha_l), f(w)\rangle) \in \Delta_{t_{l+1}'}$. By the induction hypothesis, one has $ss_l'(t_{l+1}') = f(ss_l(t_{l+1})) = f(\gamma) = f(\gamma) = f(w')$. From Lemmas 5 and 6 and the property of $\gamma_0$, one gets that $ss_l'(f(n+1)) = f ss_l'(n'+1)) = \gamma_0\$ = f(\gamma_0\$) = f(ss_l(n_l 1))$. Therefore, one has $\langle(f(g_l), n_l', \alpha_l), ss_l'\rangle \to_{t_{l+1}'} \langle(f(g_{l+1}), n_l'+1, \alpha_l), ss_l'[t_{l+1}':=f(w)f(w')]\rangle$.

2. $(n_l+1 \notin c)$: One can extend the remaining function $f$ so that $f(n_l+1) = k$. By Assumption, A2.1, one has $(k, \langle f(g_l), f(\gamma)\rangle, \langle f(g_{l+1}), f(w)\rangle) \in \Delta_F$. By the rule (ABSFORKNONDET), one gets $(\langle(f(g_l), n_l', \alpha_l), f(\gamma)\rangle, \langle(f(g_{l+1}), n_l', \alpha_l) f(w)\rangle) \in \Delta_{t_{l+1}'}$. By the induction hypothesis, one has $ss_l'(t_{l+1}') = f(ss_l(t_{l+1})) = f(\gamma) = f(w')$. From Lemmas 5 and 6 and the property of $\gamma_0$, one gets that $ss_l'(f(n+1))=ss_l'(k)=\gamma_0\$=f(\gamma_0\$)=f(ss_l(n+1))$. Therefore, one has $\langle(f(g_l), n_l', \alpha_l), ss_l'\rangle \rightarrow_{t_{l+1}} \langle(f(g_{l+1}), n_l'+1, \alpha_l), ss_l'[t_{l+1}':=f(w)f(w')]\rangle$.

(JOIN) One has $\langle c, g_l, n_l, ss_l\rangle \leadsto \langle c, g_{l+1}, n_l, ss_l[t_{l+1}:=ww']\rangle$, where $t_{l+1}\in c$, $t_{l+1}\leq n_l$, $ss_l(t_{l+1})=\gamma w'$, $(x, \langle g_l, \gamma\rangle, \langle g_{l+1}, w\rangle)\in\Delta$ for some $x\in LTV$, and $ss_l(\gamma(x))=\epsilon$. By the induction hypothesis, one has $dom(f)=\{t\in Tid|0\leq t\leq n_l\}$. Therefore $t_{l+1}\in dom(f)\cap c$ and by the induction hypothesis, one gets $f(t_{l+1})\leq n_l'$. Let $t_{l+1}'f(t_{l+1})$. By Assumption A3.1, one has $(x, \langle f(g_l), f(\gamma)\rangle, \langle f(g_{l+1}), f(2)\rangle)\in\Delta_F$. By the induction hypothesis, one has $ss_l'(f(\gamma)(x))=ss_l'(f(\gamma(x)))=f(ss_l(\gamma(x)))=f(\epsilon)$. From Lemma 7, one gets $f(\gamma)(x)\in\alpha_l$. By rule (ABSJOIN), one gets $(\langle f(g_l), n_l', \alpha_l), f(\gamma)\rangle, \langle(f(g_{l+1}), n_l', \alpha_l), f(w)\rangle)\in\Delta_{t_{l+1}}$. By the induction hypothesis, one has $ss_l'(t_{l+1}')=f(ss_l(t_{l+1}))=f(\gamma)f(w')$. Therefore, one has $\langle(f(g_l), n_l', \alpha_l), ss_l'\rangle \rightarrow_{t_{l+1}} \langle(f(g_{l+1}), n_l', \alpha_l), ss_l'[t_{l+1}':=f(w)f(w')]\rangle$.

Theorem 5 Let P be a dynamic concurrent pushdown system and k be a positive integer. Let (g, n, ss) be a k-reachable configuration of P. Then there is a total renaming function $f: Tid\rightarrow Tid_k$ and a k-reachable configuration $\langle(g', a', a), ss'\rangle$ of the concurrent pushdown system $P_k$, such that $g'=f(g)$ and $ss'(f(j))=f(ss(j))$ for all $j\in Tid$.

PROOF The proof follows immediately from Lemma 8.

Lemma 9 For every k-bounded execution $\langle(g_0', n_0', \alpha_0), ss_0'\rangle \rightarrow_{t_1'} \langle(g_1', n_1', \alpha_1), ss_1'\rangle \rightarrow_{t_2'} \ldots \rightarrow_{t_l'} \langle(g_l', n_l', \alpha_l), ss_l'\rangle$ of $P_k$, there is a renaming function $f: Tid\rightarrow Tid_k$, and an ex$\leadsto$ion $\langle g_0, n_0, ss_0\rangle \leadsto \ldots n_l, ss_l\rangle, \ldots \langle g_l, n_l, ss_l\rangle$ of P such that the following statements are true.

1. $dom(f)=\{t\in Tid|0\leq t\leq n_l\}$.
2. $f$ maps $dom(f)\setminus\{t\in Tid|f(t)=k\}$ one-one onto $\{t\in Tid|0\leq t\leq n_l'\}$.
3. $g'_l=f(g_l)$.
4. For all $t\in dom(f)$, $ss'_l(f(t))=f(ss_l(t))$.

PROOF The proof can be done by induction over the length l of the k-bounded execution sequence of the dynamic concurrent pushdown system.

Base case (l=0): Let $f$ be such that $f(0)=0$ and $f$ is undefined elsewhere. It is known that $n'_0=0$ and $n_0=0$. Therefore $dom(f)=\{t\in Tid|0\leq t\leq n_l\}$ and $f$ maps $dom(f)$ one-one onto $\{t\in Tid|0\leq t\leq n'_l\}$. From the property of $g_0$, we get that $g'_0=f(g_0)=g_0$. From the property of $\gamma_0$, one gets that $\gamma'_0=f(\gamma_0)=\gamma_0$. Therefore $ss'_0(f(0))=ss'_0(0)=\gamma_0\$=ss_0(0)$.

Inductive case: It is assumed that the theorem holds for l with a renaming function $f$. One can now prove the theorem for l+1 by a case analysis.

(ABSSEQ): One has $\langle(g_l', n_l', \alpha_l), ss_l'\rangle \rightarrow_{t_{l+1}} \langle(g_{l+1}', n_l', \alpha_l), ss_l'\rangle$, where $0\leq t_{l+1}'\leq n_l'$. By the induction hypothesis, one has $dom(f)=\{t\in Tid|0\leq t\leq n_l\}$ and there is $t_{l+1}\in dom(f)$ such that $t_{l+1}'=f(t_{l+1})$. Let $ss_l(t_{l+1})=\gamma w'$. By the induction hypothesis, one has $ss_l'(t_{l+1}')=f(ss_l(t_{l+1}))=f(\gamma)f(w')$ and $g_l'=f(g_l)$. Let $ss_l'(t_{l+1}')=w_{l+1}'f(w')$. Then $(\langle f(g_l), f(\gamma)\rangle, \langle g_{l+1}', w_{l+1}'\rangle)\in\Delta$. By Assumption A1.2, there exist $g_{l+1}$ and $w_{l+1}$ such that $g_{l+1}'=f(g_{l+1})$, $w_{l+1}'=f(w_{l+1})$, and $(\langle g_l, \gamma\rangle, \langle g_{l+1}, w_{l+1}\rangle)\in\Delta$. By rule (SEQ), one gets $\langle g_l, n_l, ss_l\rangle \leadsto \langle g_{l+1}, n_l, ss_l[t_{l+1}:=w_{l+1} w']\rangle$.

(ABSSEQEND): One has $\langle(g_l', n_l', \alpha_l), ss_l'\rangle \rightarrow_{t_{l+1}} \langle(g_l', n_l', \alpha_l\cup\{t_{l+1}'\}), ss_l'[t_{l+1}':=\epsilon]\rangle$, where $0\leq t_{l+1}'\leq n_l'$ and $s_l'_{l+1}'(t_{l+1}')=\$$. By the induction hypothesis, one has $dom(f)=\{t\in Tid|0\leq t\leq n_l\}$ and there is $t_{l+1}\in dom(f)$ such that $t_{l+1}'=f(t_{l+1})$. By the induction hypothesis, one has $\$=ss_l'(t_{l+1}')=f(ss_l(t_{l+1}))$. Therefore $ss_l(t_{l+1})=\$$. By rule (SEQEND), one gets $\langle g_l, n_l, ss_l\rangle \leadsto \langle g_l, n_l, ss_l[t_{l+1}:=\epsilon]\rangle$.

(ABSFORK): One has $\langle(g_l', n_l', \alpha_l), ss_l'\rangle \rightarrow_{t_{l+1}} \langle(g_l', n_l'+1, \alpha_l), ss_l'\rangle$, where $0\leq t_{l+1}'\leq n_l'$ and $n'+1<k$. By the induction hypothesis, one has $dom(f)=\{t\in Tid|0\leq t\leq n_l\}$ and there is $t_{l+1}\in dom$ $(f)$ such that $t_{l+1}'=f(t_{l+1})$. Let $ss_l(t_{l+1})=\gamma w'$. By the induction hypothesis, one has $ss_l'(t_{l+1}')=f(ss_l(t_{l+1}))=f(\gamma)f(w')$ and $g_l'=f(g_l)$. Let $ss_{l+1}'(t_{l+1}')=w_{l+1}'f(w')$. Extend $f$ to $n_l+1$ so that $f(n_l+1)=n_l'+1$. Then $(f(n_l+1), \langle f(g_l), f(\gamma)\rangle, \langle g_{l+1}', w_{l+1}'\rangle)\in\Delta_F$. By Assumption A2.2, there exist $g_{l+1}$ and $w_{l+1}$ such that $g_{l+1}'=f(g_{l+1})$, $w_{l+1}'=f(w_{l+1})$ and $n_l+1, \langle g_l, \gamma\rangle, \langle g_{l+1}, w_{l+1}\rangle)\in\Delta_F$. By rule (FORK), we get $\langle g_l, n_l, ss_l\rangle \leadsto \langle g_{l+1}, n_l+1, ss_l[t_{l+1}:=w_{l+1} w']\rangle$. From Lemmas 5 and 6 and the property of $\gamma_0$, one gets that $ss_l'(f(n_l+1))=ss_l'(n_l+1)=\gamma_0\$=f(\gamma_0\$)=f(ss_l(n_l+1))$.

(ABSFORKNONDET): One has $\langle(g_l', n_l', \alpha_l), ss_l'\rangle \rightarrow_{t_{l+1}} \langle(g_{l+1}', n_l'+1, \alpha_l), ss_{l+1}'\rangle$ where $0\leq t_{l+1}'\leq n_l'$. By the induction hypothesis, one has $dom(f)=\{t\in Tid|0\leq t\leq n_l\}$ and there is $t_{l+1}\in dom(f)$ such that $t_{l+1}'=f(t_{l+1})$. Let $ss_l(t_{l+1})=\gamma w'$. By the induction hypothesis, one has $ss_l'(t_{l+1}')=f(ss_l(t_{l+1}))=f(\gamma)f(w')$ and $g_l'=f(g_l)$. Let $ss_{l+1}'(t_{l+1}')=w_{l+1}'f(w')$. Extend $f$ to $n_l+1$ so that $f(n_l+1)=k$. Then $(f(n_l+1), \langle f(g_l), f(\gamma)\rangle, \langle g_{l+1}', w_{l+1}'\rangle)\in\Delta_F$. By Assumption A2.2, there exist $g_{l+1}$ and $w_{l+1}$ such that $g_{l+1}'=f(g_{l+1})$, $w_{l+1}'=f(w_{l+1})$, and $(n_l+1, \langle g_l, \gamma\rangle, \langle g_{l+1}, w_{l+1}\rangle)\in\Delta_F$. By rule (FORK), one gets $\langle g_l, n_l, ss_l\rangle \leadsto \langle g_{l+1}, n_l+1, ss_l[t_{l+1}:=w_{l+1} w']\rangle$. From Lemmas 5 and 6 and the property of $\gamma_0$, one gets that $ss_l'(f(n_l+1))=ss_l'(n_l+1)=\gamma_0\$=f(\gamma_0\$)=f(ss_l(n_l+1))$.

(ABSJOIN) One has $\langle(g_l', n_l', \alpha_l), ss_l'\rangle \rightarrow_{t_{l+1}} \langle(g_{l+1}', n_l'+1, \alpha_l), ss_l'\rangle$, where $0\leq t_{l+1}'\leq n_l'$. By the induction hypothesis, one has $dom(f)=\{t\in Tid|0\leq t\leq n_l\}$ and there is $t_{l+1}\in dom(f)$ such that $t_{l+1}'=f(t_{l+1})$. Let $ss_l(t_{l+1})=\gamma w'$. By the induction hypothesis, one has $ss_l'(t_{l+1}')=f(ss_l(t_{l+1}))=f(\gamma)f(w')$ and $g_l'=f(g_l)$. Let $ss_{l+1}'(t_{l+1}')=w_{l+1}'f(w')$. Then there is $x\in LTV$ such that $(x, \langle f(g_l), f(\gamma)\rangle, \langle g_{l+1}', w_{l+1}'\rangle)\in\Delta_J$ and $f(\gamma)(x)\in\alpha_l$. By Assumption A3.2, there exist $g_{l+1}$ and $w_{l+1}$ such that $g_{l+1}'=f(g_{l+1})$, $w_{l+1}'=f(w_{l+1})$, and $(x, \langle g_l, \gamma\rangle, \langle g_{l+1}, w_{l+1}\rangle)\in\Delta_J$. From Lemma 7, one gets $ss_l'(f(\gamma)(x))=\epsilon$. By the induction hypothesis, one gets $ss_l(f(\gamma)(x))=\epsilon$. By rule (JOIN), one gets $\langle g_l, n_l, ss_l\rangle \leadsto \langle g_{l+1}, n_l+1, ss_l[t_{l+1}:=w_{l+1} w']\rangle$.

Theorem 6 Let P be a dynamic concurrent pushdown system and k be a positive integer. Let $\langle(g', n', \alpha), ss'\rangle$ be a k-reachable configuration of the concurrent pushdown system $P_k$. Then there is a total renaming function $f: Tid\rightarrow Tid_k$ and a k-reachable configuration (g, n, ss) of P such that $g'=f(g)$ and $ss'(f(j))=f(ss(j))$ for all $j\in Tid$.

PROOF The proof follows immediately from Lemma 9.

Example 30

Exemplary Computing Environment

Figure 9:
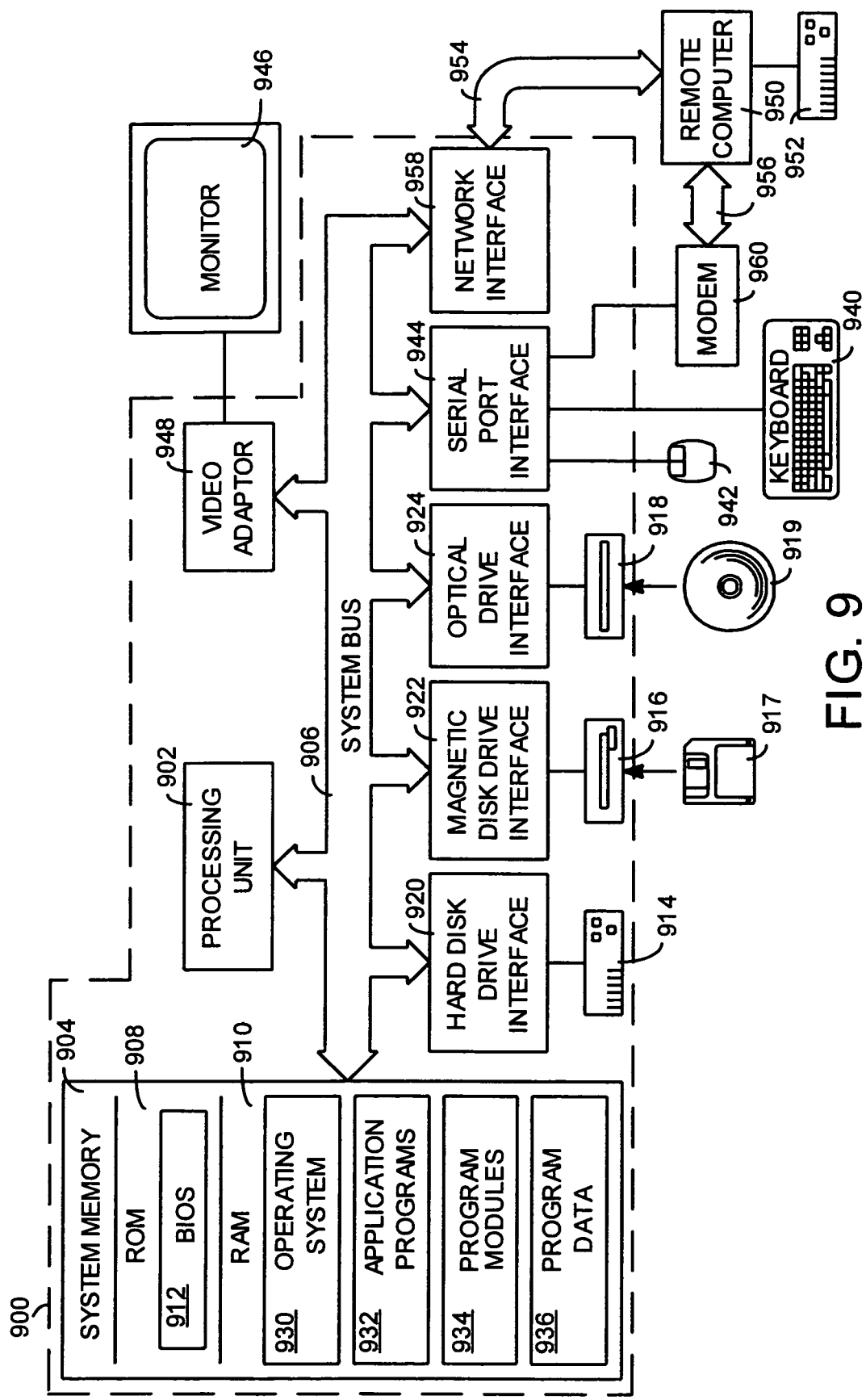
FIG. 9 is a flowchart showing an exemplary computing environment in which the disclosed technology may be implemented.

FIG. 9 and the following discussion are intended to provide a brief, general description of an exemplary computing environment in which the disclosed technology may be implemented. Although not required, the disclosed technology will be described in the general context of computer-executable instructions, such as program modules, being executed by a personal computer (PC). Generally, program modules include routines, programs, objects, components, data structures, etc. that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 9, an exemplary system for implementing the disclosed technology includes a general purpose computing device in the form of a conventional PC 900, including a processing unit 902, a system memory 904, and a system bus 906 that couples various system components including the system memory 904 to the processing unit 902. The system bus 906 may be any of several types of bus structures including a memory bus or memory controller, a peripheral bus, and a local bus using any of a variety of bus architectures. The system memory 904 includes read only memory (ROM) 908 and random access memory (RAM) 910. A basic input/output system (BIOS) 912, containing the basic routines that help with the transfer of information between elements within the PC 900, is stored in ROM 908.

The PC 900 further includes a hard disk drive 914 for reading from and writing to a hard disk (not shown), a magnetic disk drive 916 for reading from or writing to a removable magnetic disk 917, and an optical disk drive 918 for reading from or writing to a removable optical disk 919 (such as a CD-ROM or other optical media). The hard disk drive 914, magnetic disk drive 916, and optical disk drive 918 are connected to the system bus 906 by a hard disk drive interface 920, a magnetic disk drive interface 922, and an optical drive interface 924, respectively. The drives and their associated computer-readable media provide nonvolatile storage of computer-readable instructions, data structures, program modules, and other data for the PC 900. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk, magnetic disk 917, optical disk 919, ROM 908, or RAM 910, including an operating system 930, one or more application programs 932, other program modules 934, and program data 936. A user may enter commands and information into the PC 900 through input devices such as a keyboard 940 and pointing device 942 (such as a mouse). Other input devices (not shown) may include a digital camera, microphone, joystick, game pad, satellite dish, scanner, or the like. These and other input devices are often connected to the processing unit 902 through a serial port interface 944 that is coupled to the system bus 906, but may be connected by other interfaces such as a parallel port, game port, or universal serial bus (USB). A monitor 946 or other type of display device is also connected to the system bus 906 via an interface, such as a video adapter 948. Other peripheral output devices, such as speakers and printers (not shown), may be included.

The PC 900 may operate in a networked environment using logical connections to one or more remote computers, such as a remote computer 950. The remote computer 950 may be another PC, a server, a router, a network PC, or a peer device or other common network node, and typically includes many or all of the elements described above relative to the PC 900, although only a memory storage device 952 has been illustrated in FIG. 9. The logical connections depicted in FIG. 9 include a local area network (LAN) 954 and a wide area network (WAN) 956. Such networking environments are commonplace in offices, enterprise-wide computer networks, intranets, and the Internet.

When used in a LAN networking environment, the PC 900 is connected to the LAN 954 through a network interface 958. When used in a WAN networking environment, the PC 900 typically includes a modem 960 or other means for establishing communications over the WAN 956, such as the Internet. The modem 960, which may be internal or external, is connected to the system bus 906 via the serial port interface 944. In a networked environment, program modules depicted relative to the personal computer 900, or portions thereof, may be stored in the remote memory storage device. The network connections shown are exemplary, and other means of establishing a communications link between the computers may be used.

ALTERNATIVES

The technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. Rather, the scope of the invention includes what is covered by the following claims. We therefore claim as our invention all that comes within the scope and spirit of these claims.

We claim:

1. One or more computer-readable media having computer-executable instructions for performing a method comprising:
   receiving a representation of a plurality of software instructions of a multi-threaded program;
   constructing a pushdown system representation of the plurality of software instructions, the pushdown system modeling a plurality of threads subject to context switches, the pushdown system also modeling at least one thread representative of one or more threads not subject to context switches; and
   determining validity of one or more assertions for any concurrent execution of the plurality of software instructions having at most k−1 context switches, wherein k is a bounded positive value, wherein the determining validity of the one or more assertions accounts for execution of the software instructions in an unbounded stack depth scenario, and wherein the determining validity of the one or more assertions is performed for at least a first thread of the modeled plurality of threads and a second thread of the modeled plurality of threads, the first thread configured to execute a first sub-plurality of the plurality of software instructions and the second thread configured to execute a second sub-plurality of the plurality of software instructions, the first sub-plurality of software instructions being separate from the second sub-plurality of software instructions, the first thread being configured to execute the first sub-plurality of the
   plurality of software instructions concurrently with the second thread's execution of the second sub-plurality of the plurality of software instructions.

2. The one or more computer-readable media of claim 1, wherein the determining validity of the one or more assertions comprises determining reachability via the concurrent pushdown system.

3. The one or more computer-readable media of claim 2, wherein the method further comprises:
   defining a k-bounded transition relation for the concurrent pushdown system.

4. The one or more computer-readable media of claim 3, wherein the method further comprises:
   defining at least one aggregate configuration based at least in part upon the k-bounded transition relation.

5. The one or more computer-readable media of claim 1, wherein the determining comprises:

generating a finite representation of an unbounded set of stack configurations.

6. The one or more computer-readable media of claim 1, wherein the determining validity of the one or more assertions accounts for thread creation during execution of the plurality of software instructions.

7. The one or more computer-readable media of claim 1, the method further comprising:
translating the plurality of software instructions into the representation of the plurality of software instructions.

8. The one or more computer-readable media of claim 1, wherein the method further comprises:
determining reachability of at least one execution path within the pushdown system.

9. A method comprising:
receiving, using a computer, a plurality of source code software instructions;
translating, using the computer, the plurality of source code software instructions into a finite data domain representation of the plurality of source code software instructions;
constructing, using the computer, a pushdown system representing the finite data domain representation and comprising a plurality of states, wherein the pushdown system models a plurality of threads; and
determining, using the computer, validity of one or more assertions for any concurrent execution of the plurality of software instructions having at most k−1 context switches, wherein k is a bounded positive value, the determining validity of one or more assertions comprising processing a list of one or more items, each of the one or more items comprising an indication of a set of global states, an indication of the pushdown system and an index value, the processing the list comprising renaming all but one of the plurality of states of the pushdown system to states that are not in the indicated set of global states, and wherein the determining validity of the one or more assertions is performed for at least a first thread of the modeled plurality of threads and a second thread of the modeled plurality of threads, the first thread configured to execute a first sub-plurality of the plurality of source code software instructions and the second thread configured to execute a second sub-plurality of the plurality of source code software instructions, the first sub-plurality of source code software instructions being separate from the second sub-plurality of source code software instructions, the first thread being configured to execute the first sub-plurality of the plurality of source code software instructions concurrently with the second thread's execution of the second sub-plurality of the plurality of source code software instructions.

10. A system comprising:
a processor; and
one or more computer-readable media having encoded thereon,
a stored representation of a context-switches upper bound, and
a model checker component configured to cause the processor to check a representation of a plurality of software instructions of a multi-threaded program and to construct a pushdown system representation of the plurality of software instructions, the pushdown system modeling a plurality of threads subject to context switches and at least one thread representative of one or more threads not subject to context switches, wherein the model checker component is configured to cause the processor to check validity of one or more assertions for any multi-threaded execution of the multi-threaded program with at most a number of context switches determined based at least in part upon the context-switches upper bound, wherein the model checker component is further
configured to cause the processor to determine validity for execution of the multi-threaded program in an unbounded stack scenario, and wherein the checking validity of the one or more assertions is performed for at least a first thread of the modeled plurality of threads and a second thread of the modeled plurality of threads, the first thread configured to execute a first sub-plurality of the plurality of software instructions and the second thread configured to execute a second sub-plurality of the plurality of software instructions, the first sub-plurality of software instructions being separate from the second sub-plurality of software instructions, the first thread being configured to execute the first sub-plurality of the plurality of software instructions concurrently with the second thread's execution of the second sub-plurality of the plurality of software instructions.

11. The system of claim 10, wherein the model checker component is further configured to cause the processor to report one or more assertions as invalid, and wherein every assertion reported by the processor as invalid is invalid.

12. The system of claim 10, wherein the model checker is further configured to cause the processor to identify every assertion violation that can
be manifested with up to k−1 context switches, and wherein k is a bounded positive value.

13. The system of claim 10 wherein the model checker component is further configured to cause the processor to account for creation of one or more threads during execution of the multi-threaded program.

14. The system of claim 10, wherein the model checker component is further configured to cause the processor to perform a reach ability analysis for the multi-threaded program.

15. The system of claim 14 wherein the reach ability analysis comprises searching through a plurality of possible execution paths within the pushdown system representation.

* * * * *